(12) United States Patent
Barega

(10) Patent No.: US 12,330,088 B2
(45) Date of Patent: Jun. 17, 2025

(54) COALESCING FILTER ELEMENT AND MULTI-PHASIC FLUID SEPARATING METHOD

(71) Applicant: INDUFIL BV, Duiven (NL)

(72) Inventor: Esayas Barega, Duiven (NL)

(73) Assignee: INDUFIL BV, Duiven (NL)

( * ) Notice: Subject to any disclaimer, the term of this patent is extended or adjusted under 35 U.S.C. 154(b) by 422 days.

(21) Appl. No.: 17/776,820

(22) PCT Filed: Nov. 13, 2020

(86) PCT No.: PCT/EP2020/082158
§ 371 (c)(1),
(2) Date: May 13, 2022

(87) PCT Pub. No.: WO2021/094596
PCT Pub. Date: May 20, 2021

(65) Prior Publication Data
US 2023/0233957 A1    Jul. 27, 2023

(30) Foreign Application Priority Data

Nov. 13, 2019 (GB) ...................................... 1916518
Feb. 6, 2020 (GB) ...................................... 2001647

(51) Int. Cl.
*B01D 17/04*    (2006.01)

(52) U.S. Cl.
CPC ................................. *B01D 17/045* (2013.01)

(58) Field of Classification Search
None
See application file for complete search history.

(56) References Cited

U.S. PATENT DOCUMENTS 3,256,997 A    6/1966  Pall et al.
3,268,442 A    8/1966  Pall et al.
(Continued)

FOREIGN PATENT DOCUMENTS

EP      1201286 A1    5/2002
GB       825192 A    12/1959
(Continued)

OTHER PUBLICATIONS

GB Examination Report for Application No. GB1916518.2, mailed Dec. 13, 2021, 6 pages.
(Continued)

*Primary Examiner* — Chester T Barry
(74) *Attorney, Agent, or Firm* — CANTOR COLBURN LLP

(57) ABSTRACT

The present disclosure relates to the field of coalescing filter elements for separating a multi-phasic fluid. An aspect of the disclosure provides a coalescing filter element for separating a multi-phasic fluid comprising a first phase and a second phase, the filter element comprising: a first filter stage (102) for coalescing the first phase to provide an intermediate feed, a second filter stage (103) for coalescing the first phase from the intermediate feed, a selectively permeable barrier (104) which permits outflow of the second phase and inhibits outflow of the first phase, and a drain arranged between the second filter element and the selectively permeable barrier to allow outflow of the first phase.

18 Claims, 7 Drawing Sheets

(56) References Cited

U.S. PATENT DOCUMENTS

| | | | |
|---|---|---|---|
| 4,995,974 A | | 2/1991 | Lorey et al. |
| 9,764,965 B1 * | | 9/2017 | Nohren, Jr. .......... B01D 46/527 |
| 10,512,862 B2 * | | 12/2019 | Ferreira ................ B01D 39/18 |
| 2011/0168621 A1 | | 7/2011 | Wieczorek et al. |
| 2015/0027942 A1 * | | 1/2015 | Chen ..................... B01D 17/02 |
| | | | 210/323.2 |
| 2020/0155991 A1 | | 5/2020 | Goris et al. |

FOREIGN PATENT DOCUMENTS

| | | | | |
|---|---|---|---|---|
| TW | 200403093 A | * | 3/2004 | ........... B01D 29/114 |
| WO | 2018229644 A1 | | 12/2018 | |

OTHER PUBLICATIONS

GB Examination Report for Application No. GB1916518.2, mailed Oct. 19, 2020, 7 pages.
GB Search Report for Application No. GB1916518.2, mailed Dec. 20, 2019, 8 pages.
GB Search Report for Application No. GB1916518.2, mailed Oct. 20, 2020, 2 pages.
Notification of Transmittal of the International Search Report and the Written Opinion of the International Searching Authority, or the Declaration; PCT/EP2020/082158; Apr. 22, 2021, 15 Pages.
1 GB Examination Report for Application No. GB1916518.2, mailed Nov. 21, 2023, 3 pages.

* cited by examiner

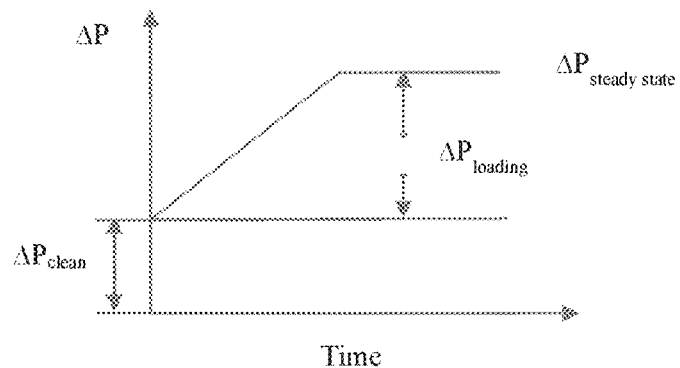
Figure 5 - Pressure drop versus time for a water-diesel separator
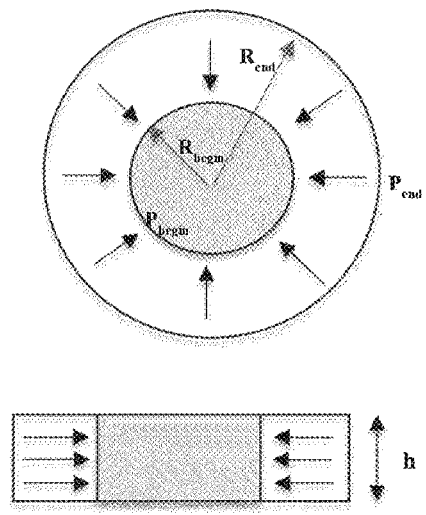
Figure 6. Cross section of the flow system used for permeability calculations.

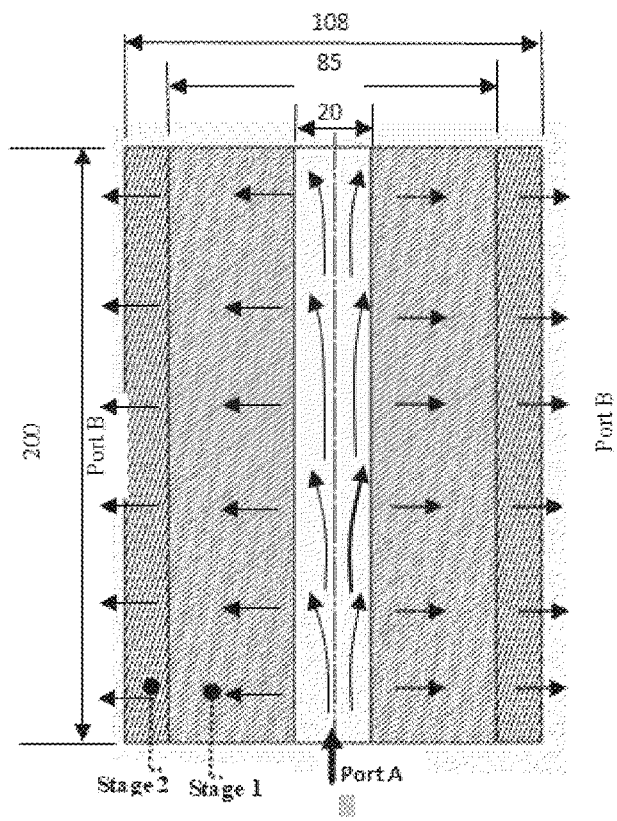
Figure 7 A cross section of two filter stages of a simulated diesel filter
Port A: An inlet of water-in-diesel mixture.
Port B: An outlet of filtered diesel.
Dimensions are in mm
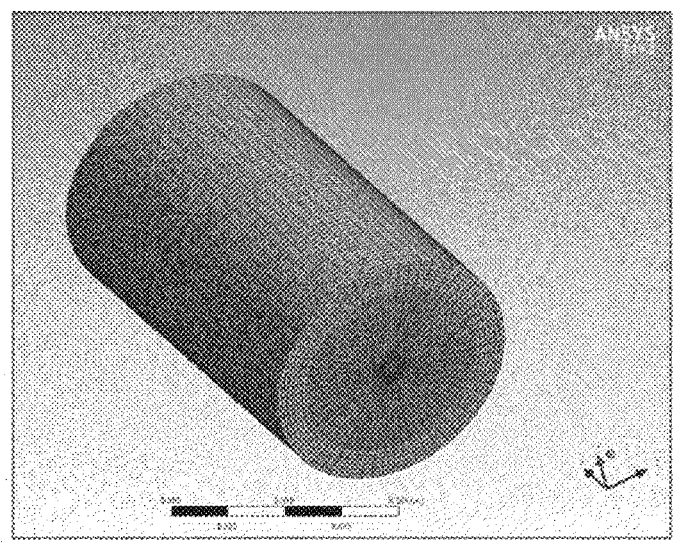
Figure 8 Computational domain of the simulated diesel filter model with 3D generated mesh

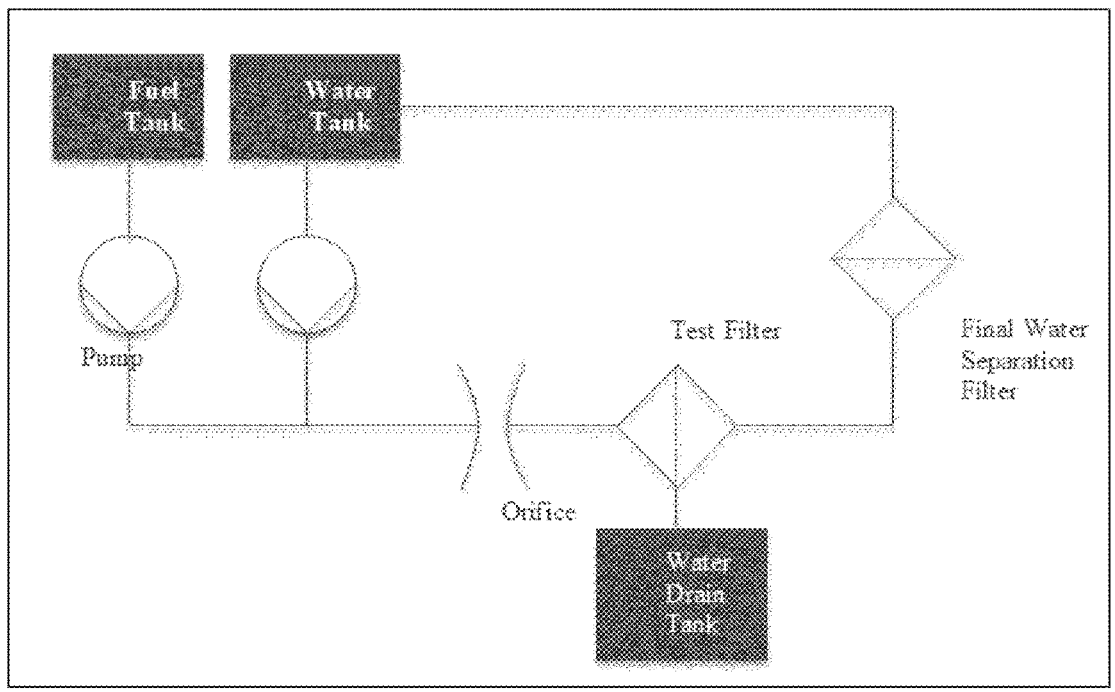
Fig. 9. Experimental setup according to ISO standard 16332 for water diesel separation test.

COALESCING FILTER ELEMENT AND MULTI-PHASIC FLUID SEPARATING METHOD

CROSS REFERENCE TO RELATED APPLICATIONS

This is a US National Stage of Application No. PCT/EP2020/082158, filed on Nov. 13, 2020, which claims the benefit of GB Application No. 1916518.2 filed Nov. 13, 2019 and GB Application No. 2001647.3 filed Feb. 6, 2020, the disclosures of which are incorporated herein by reference.

TECHNICAL FIELD

The present disclosure relates to the field of coalescing filter elements for separating a multi-phasic fluid.

BACKGROUND

In a variety of industries, there is a need to separate fluid mixtures, such as mixtures of liquids. These may comprise hydrophobic (e.g. non-polar) liquids, and hydrophilic (e.g. polar) liquids, and other types of immiscible, or partially immiscible, liquids. Such different fluids may be referred to herein as "phases". Multi-phasic flows comprise a first phase dispersed in a second phase, for example, in the form of dispersed droplets. It is difficult to separate multi-phasic flows into their respective first phase and second phase.

One example of system in which there may be an issue is in diesel fuel systems. In such systems, water in the fuel can damage fuel injectors, can plug filters, and can result in a corrosion of fuel system components. In lubrication oil systems, water modifies properties of the lube oil and therefore interferes with the lubrication of critical turbomachinery parts. Additionally the presence of water in such systems may result in microbial growth with the system and corrosion of system components. To ensure safe and failure free operation of such systems, excess free and emulsified water in diesel fuel and lube oil must be removed.

SUMMARY

Aspects of the disclosure are set out in the independent claims and optional features are set out in the dependent claims. Aspects of the disclosure may be provided in conjunction with each other, and features of one aspect may be applied to other aspects.

In a first aspect there is provided a coalescing filter element for separating a multi-phasic fluid comprising a first phase and a second phase, the filter element comprising: a first filter stage for coalescing the first phase to provide an intermediate feed, a second filter stage for coalescing the first phase from the intermediate feed, a selectively permeable barrier which permits outflow of the second phase and inhibits outflow of the first phase, and a drain arranged between the second filter element and the selectively permeable barrier to allow outflow of the first phase. The second phase may be continuous and the first phase may be dispersed therein.

The components of the coalescing filter element and their relative arrangements may provide a coalescing filter element which can provide improved separation efficiency.

The second filter stage may surround the first filter stage. This may enable a constructions in which a feed to be separated can be fed to each of a set of such filter elements at a controlled rate, enabling the set to be efficiently used in parallel.

The first filter stage may provide a first flow cross section for flow of the feed through the first filter stage, and the second filter stage may provide a second flow cross section for flow of the intermediate feed through the second filter stage, wherein the first flow cross section is larger than the second flow cross section. The flow cross section of a filter stage may comprise the area of the filter through which the fluid feed is able to flow. The first and second flow cross sections may be selected based on the volumetric flow rate of the feed which is to pass through the coalescing filter element. For example, the first and second flow cross sections may be selected so that the first filter stage may have a smaller mean pore size than the second filter stage. The smaller mean pore size of the first filter stage may reduce volumetric flow rate through that filter stage (per unit flow cross section). Thus, the flow cross sections of the two filter stages may be chosen according to their mean pore size to provide a flow rate which matches the volumetric flow rate for which the filter element is designed. The flow cross sections of the two filter stages may be to provide a required separation efficiency for a given flowrate and initial characteristic size of droplets of the first phase.

The first filter stage may be spaced from the second filter stage to control the residence time of the intermediate feed between the first filter stage and the second filter stage. For example, the residence time of the intermediate feed (also referred to herein as the intermediate feed residence time) may be the average time in which a notional volume element of the fluid (hereinafter referred to as a "fluid particle") is located within the space between the first filter stage and the second filter stage 103. In other words, the intermediate feed residence time may be defined as the average shortest distance between the first filter stage and the second filter stage divided by the average speed of the intermediate feed relative to the coalescing filter element. Increasing the intermediate residence time allows droplets of the first phase to coalesce further within the space between the first and second filter stages which in turn reduces re-entrainment of the first phase within the second phase.

The drain may have a drain cross section in fluid communication with a gap between the second filter stage and the selectively permeable barrier and the drain cross section may be selected based on a residence time of the multi-phasic fluid in the gap. The drain cross section may be selected based on the volumetric flow rate of the intermediate feed which is to pass through the drain. For example, the drain cross section may be selected so that it is proportional to the volumetric flow rate for which the filter element is designed.

The volumetric flow rate of the intermediate feed which is to pass through the drain, $Q_{slot}$, is constrained by the volumetric flow rate of the intermediate feed which is to pass through the selectively permeable barrier, $Q_{barrier}$, and also the volumetric flow rate of the intermediate feed which enters the gap (which in steady state operation of the filter element is equal to the volumetric flow rate of the fluid feed entering the filter element, $Q_{IN}$. In particular, this constraint may be expressed mathematically as:

$$Q_{IN} = Q_{barrier} + Q_{slot}$$

For example, for the same volumetric flow rate of the fluid feed entering the filter element, $Q_{IN}$, a small drain cross section may be required when the permeability of the selectively permeable barrier is small.

For example, for the same volumetric flow rate of the fluid feed entering the filter element, $Q_{IN}$, a large drain cross section may be required when the permeability of the selectively permeable barrier is large.

The residence time of the multi-phasic fluid in the gap (also referred to herein as the gap residence time) may be selected to reduce re-entrainment of the first phase within the second phase.

The gap residence time may be defined as the average time taken for a first phase droplet of a second-coalesced size entering the gap via the second filter stage to exit the gap via the drain. The separation between the second filter stage and the selectively permeable barrier may be selected based on the gap residence time and the flow rate of the fluid feed entering the filter element. For example, the separation between the second filter stage and the selectively permeable barrier may be selected so that droplets of the first phase exit the gap via the drain rather than exiting the gap via the selectively permeable barrier (e.g. to prevent re-entrainment).

Increasing the gap residence time allows droplets of the first phase to coalesce further within the gap which in turn reduces re-entrainment of the first phase within the second phase. Thus a separation efficiency of the coalescing filter element may be improved by choosing the gap residence time and/or the drain cross section according to the proportion of first phase in the multi-phasic feed. A greater quantity of dispersed phase in the feed may need a larger drain.

The gap may surround the second filter stage.

Optionally, the coalescing filter element may further comprise an inlet channel may be configured to receive the multi-phasic fluid feed and to provide the multi-phasic fluid feed to the first filter element.

Optionally, the inlet channel may be defined as an interior volume delimited by the first filter stage.

Optionally, the coalescing filter element may have a prismatic shape, such as a cylinder e.g. a circular cylinder.

An aspect provides a filtration apparatus comprising: a filter housing configured to hold a fluid; a plurality of the coalescing filter elements wherein the coalescing filter elements are disposed within the filter housing and each is connected to a separate corresponding one of a plurality of fluid inlet conduits for receiving the multi-phasic fluid, so that the separated second phase flows out of the filter elements and into the filter housing.

An aspect provides a filtration apparatus comprising: a filter housing configured to hold a fluid, the filter housing comprising an outlet, and the apparatus further comprising a plurality of the coalescing filter elements, wherein the coalescing filter elements are within the filter housing. Each of the coalescing filter elements having a feed inlet which may be configured to receive a multi-phasic fluid feed.

An embodiment provides an apparatus comprising a plurality of coalescing filter elements, such as any of those described or claimed herein, and a filter housing for holding fluid, and having a fluid outlet. The plurality of filter elements are disposed in the housing and each connected to a feed inlet, for providing a multi-phasic feed to an inlet aperture of the each filter element.

The feed inlets may each be separate, and may each provide a selected volumetric flow rate of fluid to a corresponding one of the plurality of filter elements so that each filter element receives a controlled/controllable flow of the feed. For example, the feed inlets may be controlled in that each filter element receives the same volumetric flow rate of the feed. Thus, a coalescing filter element arranged in accordance with one or more of the above features may provide improved longevity because it can provide even wear and/or clogging of each coalescing filter element.

The drain may comprise at least one slot in a base of the filter. In the apparatus described above, the drain of each filter element may be connected to allow outflow of the second phase e.g. through a second outlet from the filter housing.

Optionally, the at least one slot is arranged so that the drain cross section is evenly spatially distributed about the second filter stage. Evenly spatially distributed draining of the first phase may therefore be provided which advantageously reduces re-entrainment of the first phase into the second phase.

Optionally, there may be one slot, or more preferably two slots, or more preferably, three slots, or more preferably four slots.

The slots may have a length (e.g. for slots of an arcuate shape, the length may be equal to the length of the arc of the slot) of 50 mm or, more preferably of 40 mm or, more preferably of 30 mm or, more preferably of 20 mm or, more preferably of 10 mm.

The slots may have a width (e.g. for slots of an arcuate shape, the width may be equal to the radial width of the slot) of 3 mm.

The first filter stage may be pleated.

The second filter stage may be pleated.

The pleats of a filter stage may comprise, for example, a series of alternating folds in material which makes up the filter stage e.g. so that each fold is opposite a slot.

Pleats may have a characteristic pleat depth which may comprise the length of filter material between adjacent folds, e.g. the shortest distance along the filter media between two adjacent opposite folds of the filter media. For example, the pleat depth may comprise the radial distance (e.g. in a filter stage which is circular) between adjacent peaks and troughs of the pleated media. The depth of individual pleats may differ on the same filter stage, in which case the pleat depth may refer to the average (e.g. mean) or minimum pleat depth.

Optionally, a pleat depth of the first filter stage is greater than a pleat depth of the second filter stage.

The pleats may be evenly spatially distributed along each of the first filter stage and the second filter stage. The first stage filter may have pleats with a greater pleat depth than the second stage filter which may provide a coalescing filter element wherein the first flow cross section is greater than the second flow cross section.

The greater pleat depth of the first filter stages may provide a greater flow cross section than the second filter stage, which may permit the first filter stage to have a smaller pore size but still provide a flow rate which matches that of the second filter stage.

The second filter stage may be rolled.

The first filter stage may be configured for coalescing smaller droplets than the second coalescing filter stage.

For example, the first filter stage may comprise a mean pore size smaller than a mean pore size of the second filter stage.

The first filter stage may cause droplets of the first phase to coalesce into droplets of a first-coalesced characteristic size. The second filter stage may cause droplets of the first phase to coalesce into droplets of a second-coalseced characteristic size. The first-coalesced characteristic size may be less than the second-coalescedcharacteristic size.

This may cause the first phase to be coalesced into droplets of greater characteristic size as the first phase moves through the coalescing filter element. As the characteristic size of the droplets of the first phase increases, advantageously the chance of re-entrainment of the first phase into the second phase is reduced.

The first and second filter stages may both be selective for coalescing one type of fluid selected from the list (a) hydrophilic fluids; and (b) hydrophobic fluids.

In an embodiment the first filter stage has a permeability ($K_{21}$) of more than $2 \times 10^{-11}$ m$^2$, for example about $2.2 \times 10^{-11}$ m$^2$. In an embodiment the first filter stage has a permeability ($K_{21}$) of less than $9 \times 10^{-11}$ m$^2$. In an embodiment the second filter stage has a permeability ($K_{22}$) of more than $2 \times 10^{-11}$ m$^2$, for example more than $3 \times 10^{-11}$ m$^2$, for example more than $5 \times 10^{-11}$ m$^2$, for example more than $7 \times 10^{-11}$ m$^2$. In an embodiment the first filter stage has a permeability ($K_{22}$) of less than $11 \times 10^{-11}$ m$^2$.

The clean porosity of the first stage, $\Phi_{21\_i}$, may be about 0.9, for example 0.9096. The steady state porosity of the first filter stage $\Phi_{21\_SS}$ may be about 0.7, for example 0.7742. The clean porosity of the second stage, $\Phi_{22\_i}$ may be about 0.9, for example 0.9284. The steady state porosity of the second filter stage $\Phi_{22\_SS}$ may be about 0.9, for example 0.9284.

These and other embodiments may be operated with a flow rate of between 50 L/h and 200 L/h with a steady state pressure drop of between 2 KPa and 25 KPa, for example between 3 KPa and 20 KPa.

Optionally, the selectively permeable barrier is more permeable to the other type of fluid than to the one type of fluid selected from said list, for example wherein the first and second filter stages are selective for coalescing hydrophilic fluids and the selectively permeable barrier is more permeable to hydrophobic fluids than to hydrophilic fluids.

Optionally, the first filter stage comprises a non-woven material such as glass fibre.

Optionally, the second filter stage comprises Nomex®.

Optionally, the selectively permeable barrier comprises polypropylene.

Optionally, the first and second filter stages are selective for coalescing oleophilic fluids.

The selectively permeable barrier may be more permeable to oleophobic fluids than to oleophilic fluids.

An aspect provides an apparatus comprising a filter housing holding a plurality of coalescing filter elements. These may comprise any of the filter elements described or claimed herein.

The filter housing may comprise a container for fluid (e.g. liquid), and may comprise a fluid outlet. It may also comprise a plurality of feed inlets, each connected to a corresponding one of the plurality of filter elements, thereby to enable a controlled/controllable fluid feed to be provided to each filter element.

An aspect provides a method of separating a first phase from a multi-phasic fluid the fluid comprising droplets of the first phase dispersed in the second phase, the method comprising: providing a feed of the multiphasic fluid to a first filter stage to partially coalesce the droplets of the first phase to provide an intermediate feed having droplets of larger size; providing the intermediate feed to a second filter stage to further coalesce the droplets of larger size and to provide the further coalesced droplets into a gap between the first filter stage and a selectively permeable barrier; draining the further coalesced first phase from the gap while extracting fluid through the selectively permeable barrier thereby to separate the first phase.

Thus, a multi-phasic fluid comprising a first phase and a second phase may be separated.

The method may comprise draining the first phase from the gap at a flow rate selected based on the total flow rate of the multi-phasic fluid through the filter and a desired separation efficiency.

The drain may be arranged between the second filter stage and the selectively permeable barrier to allow outflow of the first phase, and the second filter stage surrounds the first filter stage.

An aspect provides a computer implemented method of designing a coalescing filter element for separating components of a fluid feed, the method comprising: identifying a dynamic viscosity, $\mu$, of the fluid feed, and a density, $\rho$, of the fluid feed, wherein the fluid feed comprises droplets of a first phase with an initial characteristic droplet size dispersed in the feed, and a second phase; identifying a target total flow rate of the fluid feed into the filter element, a target outflow rate from an output of the filter element, and a target outflow rate of the first phase from a drain of the filter, the drain having a drain cross section for draining the coalesced first phase from the filter element; and selecting the drain cross section based on the target outflow rate of the first phase, the density of the fluid, and the dynamic viscosity.

It will be appreciated in the context of the present disclosure that the filter elements described herein have a particularly useful structure that can be adapted for a wide range of applications, for processing diverse feeds with a range of flow rates. The structure of these filter elements provides useful advantages in all of these cases, and the selection of the drain cross section and the gap residence time in the manner disclosed herein provides a principle capable of general application.

The computer implemented method may comprise identifying parameters of a selectively permeable barrier for inhibiting re-entrainment of coalesced droplets of the first phase in fluid outflow from the output of the filter element, wherein the drain cross section is further based on the parameters of the selectively permeable barrier.

Parameters of the selectively permeable barrier may include the permeability of the barrier.

The drain cross section may be selected further based on a target pressure drop across the selectively permeable barrier.

The drain cross section may be selected so that the pressure change across the selectively permeable barrier, $\Delta p_{barrier}$, is equal to the sum of: the pressure change across the drain, $\Delta p_{slot}$; and, the pressure change across the gap, $\Delta p_{gap}$. This constraint may be expressed mathematically as:

$$\Delta p_{barrier} = \Delta p_{slot} + \Delta p_{gap}$$

The filter element may comprise: two filter stages, arranged in series, for coalescing the droplets of the first phase and a gap disposed between a second one of the two filter stages and the selectively permeable barrier, wherein the drain is provided in a base of the filter element and in the gap.

An aspect provides a method comprising manufacturing the filter element according to the first aspect wherein the flow cross section of the drain is selected according to the computer implemented method according to the fourth aspect.

An aspect provides use of a filter element such as those described and claimed herein to separate a phase from a multiphasic fluid, wherein the first phase is aqueous and the second phase is organic, for example wherein the second phase is one of diesel and lube oil.

In some examples, the first phase is an organic fluid and the second phase is an aqueous in the first phase.

In an embodiment there provided a coalescing filter element comprising, for example, non-woven filter stages which is configured to remove free and emulsified water from hydrocarbon streams.

In an embodiment there is provided a method of constructing a coalescing filter element comprising, for example, non-woven filter stages configured to remove free and emulsified water from hydrocarbon streams.

In an embodiment there is provided a coalescing filter element comprising at least two stages, for example: a first stage filter comprises a pleated multi-layer of non-woven filter media having a mean pore size of 18 to 30 μm; and, a second stage filter comprises a single or multi-layer of a coarser non-woven filter media, either rolled or pleated, having a mean pore size of 20 to 100 μm.

In an embodiment there is provided a coalescing filter element having filter stages comprising filter media having a pore size large enough to allow incident water droplets to penetrate through a depth of the filter media, for example, filter media having a mean pore size of 18 to 30 μm and/or a mean pore size of 20 to 100 μm.

In an embodiment there is provided a coalescing filter element having filter stages comprising multi-layered filter media configured to separate water dispersed in a hydrocarbon fluid, the number of layers may be selected based on, for example: the flow rate of the hydrocarbon fluid; the physical properties of the hydrocarbon fluid (e.g. dynamic viscosity, kinematic viscosity, interfacial tension with water, droplet size of the water); the characteristic mean pore size of the first filter stage and/or the second filter stage; the flow cross sections the first filter stage and/or the second filter stage.

For example, fewer layers of the filter media of a filter stage are required when the characteristic pore size of that stage is reduced.

In an embodiment there is provided a coalescing filter element having filter stages comprising multi-layered filter media configured to separate water dispersed in a hydrocarbon fluid, the size (e.g. dimensions of) of the coalescing filter element may be selected based on, for example: the flow rate of the hydrocarbon fluid; the physical properties of the hydrocarbon fluid (e.g. dynamic viscosity, kinematic viscosity, interfacial tension with water, droplet size of the water).

In an embodiment there is provided a coalescing filter element having filter elements comprising filter media with a pore size and a thickness selected to provide a residence time sufficient for water droplets to settle to a surface of the filter media.

In an embodiment there is provided a coalescing filter element having: a first stage comprising pleated four layers of non-woven glass fiber filter media; a second stage comprising pleated two layers of non-woven Nomex®; and a selectively permeable barrier comprising polypropylene.

In an embodiment there is provided a coalescing filter element having: a first stage comprising pleated four layers of non-woven glass fiber filter media; a second stage comprising rolled one layer of non-woven Nomex®; and, a selectively permeable barrier comprising polypropylene.

In an embodiment there is provided a coalescing filter element capable of filtering water dispersed in diesel to a filtration efficiency of greater than 95%, wherein, for example, the diesel has a volumetric flow rate of 450 L/hour, the water has a droplet size $d_{50}$ of 10 μm and the volumetric concentration of water in the diesel is 0.2%, and the coalescing filter element comprises four slots each of length 10 mm and width 3 mm.

In examples wherein the first and second filter stages are both selective for coalescing hydrophilic fluids it may be understood that the first and second filter stages are more selective for coalescing hydrophilic fluids than hydrophobic fluids.

In examples, the first filter stage may comprise a hydrophilic material. In examples, the second filter stage may comprise a hydrophilic material. Hydrophilic materials may be configured to be selective for coalescing hydrophilic fluids (e.g. more selective for coalescing hydrophilic fluids than hydrophobic fluids).

In examples wherein the first and second filter stages are both selective for coalescing hydrophobic fluids it may be understood that the first and second filter stages are more selective for coalescing hydrophobic fluids than hydrophillic fluids.

In examples, the first filter stage may comprise a hydrophobic material. In examples, the second filter stage may comprise a hydrophobic material. Hydrophobic materials may be configured to be selective for coalescing hydrophobic fluids (e.g. more selective for coalescing hydrophobic fluids than hydrophilic fluids).

In examples, the selectively permeable barrier may surround the second filter stage. For the avoidance of doubt, the disclosure of this application is intended to be considered as a whole. Any feature of any one of the examples disclosed herein may be combined with any selected features of any of the other examples described herein.

FIGURES

Some embodiments will now be described, by way of example only, with reference to the figures, in which:

FIG. 5 shows a plot of pressure drop versus time for a water-diesel separator;

FIG. 6 shows a cross section of a simulated flow system which may be used for permeability calculations;

FIG. 7 shows a cross section of two filter stages of a simulated diesel filter;

FIG. 8 shows a computational domain of the simulated diesel filter model with 3D generated mesh; and, FIG. 9 shows an experimental set up for a water diesel separation test according to ISO16332.

In the drawings like reference numerals are used to indicate like elements.

SPECIFIC DESCRIPTION

Embodiments of the present disclosure provide a coalescing filter element for separating a feed of multi-phasic fluid comprising a first phase and a second phase such as an aqueous phase and a non-polar (e.g. hydrocarbon) phase. Prior to filtering, the first phase comprises droplets of an initial characteristic size. The filter element comprises a first filter stage and a second filter stage e.g. both selective for coalescing the first phase which is either hydrophilic or hydrophobic. The coalescing filter element is configured: to receive the feed via an inlet channel; to permit outflow of the first phase via a drain; and, to permit outflow of the second phase via a selectively permeable barrier.

Figure 1A:
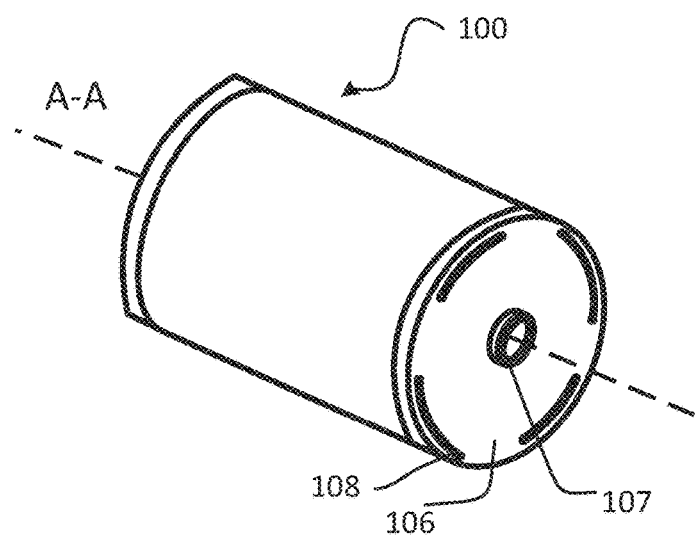
FIG. 1A is a perspective view of a coalescing filter element.
Figure 1B:
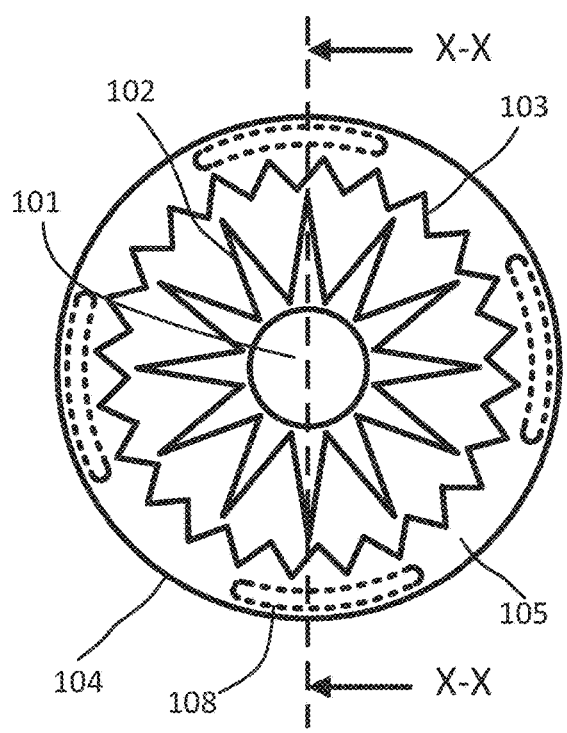
FIG. 1B is a cross-sectional view of the coalescing filter element along axis A-A.
Figure 1C:
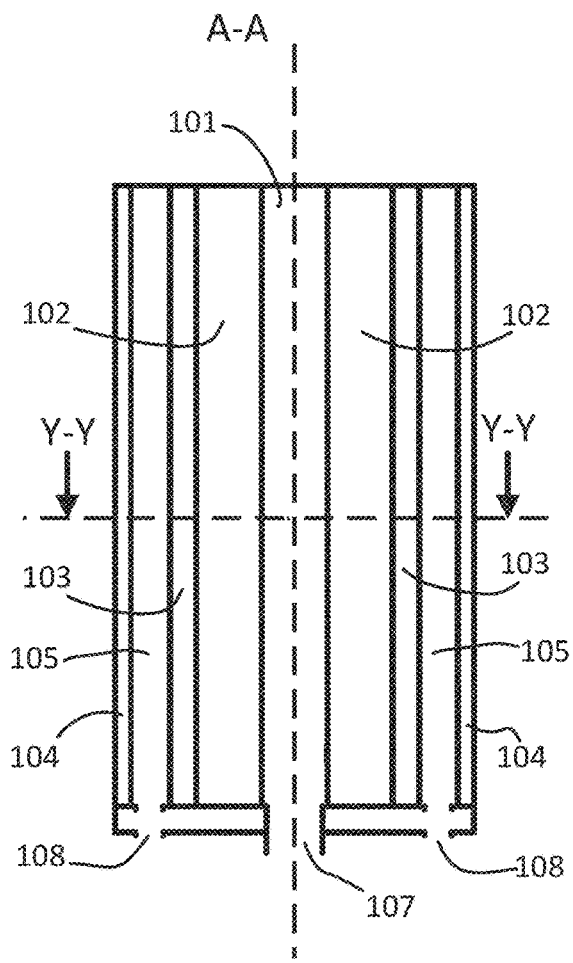
FIG. 1C is a cross-sectional view of the coalescing filter element along line X-X.

FIG. 1A shows a perspective view of a coalescing filter element of the present disclosure. FIG. 1B shows a cross-sectional view of the coalescing filter element along axis A-A in the plane Y-Y and FIG. 1C shows a cross-sectional view of the coalescing filter element in the plane X-X.

FIG. 1 shows a coalescing filter element 100 having an inlet channel 101, a first filter stage 102, a second filter stage 103, a selectively permeable barrier 104, a gap 105, and an endcup 106 having an inlet aperture 107 and a drain 108.

The inlet aperture 107 in the endcup 106 is arranged to provide fluid communication therethrough to the inlet channel 101. The first filter stage 102 is disposed around the inlet channel and the second filter stage 103 is disposed around and spaced from the first filter stage. The selectively permeable barrier 104 is disposed around and spaced from the second filter stage to provide gap 105 therebetween. The gap is in fluid communication with the drain 108.

The inlet channel 101 is configured to receive a multi-phasic fluid feed via the inlet aperture 107 and to provide the multi-phasic fluid feed to the first filter stage 102.

The first filter stage 102 is configured to receive a multi-phasic fluid feed from the inlet channel 101 and to coalesce a first phase of the fluid feed into droplets of a first-coalesced characteristic size. The first filter stage is thus configured to provide an intermediate feed comprising the first phase and the second phase, wherein the first phase comprises droplets of a first-coalesced characteristic size. The first filter stage has a first flow cross section which may be selected based on the volumetric flow rate of the fluid feed which is to pass through the first filter stage. For example, the first flow cross section may be selected based on the volumetric flow rate for which the filter element is designed. The first filter stage is spaced from the second filter stage to provide an intermediate feed residence time. The intermediate feed residence time may be the average time in which a notional volume element of the fluid (hereinafter referred to as a "fluid particle") is located within the space between the first filter stage and the second filter stage 103. In other words, the intermediate feed residence time may be defined as the average shortest distance between the first filter stage and the second filter stage divided by the average speed of the intermediate feed relative to the coalescing filter element. For example, the first flow cross section and/or the second flow cross section may be selected based on any of the following: the initial characteristic size of droplets of the first phase; the first-coalesced characteristic size of droplets of the first phase; the second-coalesced characteristic size of droplets of the first phase.

The second filter stage 103 is configured to receive the intermediate feed from the first filter stage 102 and to coalesce a first phase of the intermediate feed into droplets of a second-coalesced characteristic size. The second filter stage is further configured to provide a coalesced feed comprising the first phase and the second phase, wherein the first phase comprises droplets of a second-coalesced characteristic size. The second filter stage has a second flow cross section which may be selected based on the volumetric flow rate of the intermediate feed which is to pass through the second filter stage. For example, the second flow cross section may be selected so that it is proportional to the volumetric flow rate for which the filter element is designed. The first filter stage and the second filter stage are configured such that the first flow cross section is larger than the second flow cross section.

For example, the first flow cross section and/or the second flow cross section may be selected based on the physical properties of the second phase, which may include: the density of the second phase; the dynamic viscosity of the second phase; the initial characteristic size of droplets of the first phase; the first-coalesced characteristic size of droplets of the first phase; the second-coalesced characteristic size of droplets of the first phase.

The first-coalesced characteristic size of droplets of the first phase; the second-coalesced characteristic size of droplets of the first phase may affect a settling rate of droplets within the pores of the filter media.

For example, for a given volumetric flow rate, a more viscous second phase fluid may require a larger flow cross section to allow for a decrease in a settling rate of droplets of the first phase.

For example at a given volumetric flow rate, the flow cross section may be reduced to form, after filtration, first phase droplets with a greater characteristic size (e.g. bigger droplets are formed after passing through a filter stage with a reduced flow cross section).

The first filter stage 102 and the second filter stage 103 may be configured to selectively coalesce hydrophilic fluids, in which case, the barrier may be configured to be more permeable to hydrophobic fluid than to hydrophilic fluid. Alternatively, the first filter stage and the second filter stage may be configured to selectively coalesce hydrophobic fluids in which case, the barrier may be configured to be more permeable to hydrophilic fluid than to hydrophobic fluid.

The gap 105 is configured to receive the coalesced feed from the second filter stage 103 and to provide the coalesced feed to the selectively permeable barrier 104. The gap is further configured to provide a gap residence time of the coalesced feed in the gap. The gap residence time may be defined as the average time taken for a first phase droplet of a second-coalesced size entering the gap via the second filter stage to exit the gap via the drain. The separation between the second filter stage and the selectively permeable barrier may be selected based on the gap residence time and the flow rate of the fluid feed entering the filter element. For example, the separation between the second filter stage and the selectively permeable barrier may be selected so that droplets of the first phase exit the gap via the drain rather than exiting the gap via the selectively permeable barrier (e.g. to prevent re-entrainment). When operated in steady state the total volumetric flow rate of fluid exiting the filter element via the drain 108 and via the selectively permeable barrier 104 is equal to the total volumetric flow rate of fluid entering the filter element via inlet aperture 107. The gap is further configured to allow the droplets of the first phase having the second-coalesced characteristic size to settle towards to the drain 108 under gravity e.g. during the gap residence time. The droplets of the first phase may coalesce further in the gap to provide droplets with a final characteristic size, which is greater than the second-coalesced characteristic size.

The drain 108 has a drain cross section in fluid communication with the gap 105. The drain cross section may be selected based on the volumetric flow rate of the fluid feed which is to pass through the drain. For a given drain cross section, the volumetric flow rate of the fluid feed exiting the gap via the drain, $Q_{slot}$, may be subject to the constraint that the pressure change across the selectively permeable barrier, $\Delta p_{barrier}$, must be equal to the sum of: the pressure change across the drain, $\Delta p_{slot}$; and, the pressure change across the gap, $\Delta p_{gap}$. This may be expressed mathematically as:

$$\Delta p_{barrier} = \Delta p_{slot} + \Delta p_{gap}$$

For example, the drain cross section may be selected so that it is proportional to the volumetric flow rate for which the filter element is designed. The drain is configured to receive the first phase from the coalesced feed and thereby to allow the first phase to flow out from the coalescing filter element 100.

The selectively permeable barrier 104 is configured to permit outflow of the second phase of the coalesced feed and to inhibit outflow of the first phase of the coalesced feed therethrough. The selectively permeable barrier may be configured to repel the first phase. The selectively permeable barrier has a barrier cross section which may be selected based on the volumetric flow rate of the second phase which is to pass through the selectively permeable barrier. For example, the barrier cross section may be selected so that it is proportional to the volumetric flow rate for which the filter element is designed.

As noted above, where the first and second filter stages 102, 103 are configured to coalesce hydrophobic fluid, the selectively permeable barrier 104 may be configured to be more permeable to hydrophilic fluid than to hydrophobic fluid. Alternatively, where the first and second filter stages are configured to coalesce hydrophilic fluid, the selectively permeable barrier may be configured to be more permeable to hydrophobic to fluid than to hydrophilic fluid.

Operation of the coalescing filter element 100 may thus separate a first phase and second phase from a multi-phasic fluid feed in a manner such as that which will be described.

Typically, the multi-phasic fluid feed comprises at least a first phase and a second phase. The first phase comprises droplets of an initial characteristic size dispersed in the second phase. The initial characteristic size is typically smaller than the first-coalesced characteristic size mentioned above.

In use, the multi-phasic fluid feed is provided to the coalescing filter element 100 through the inlet aperture 107 into the inlet channel 101. The fluid feed then passes through the first filter stage 102. The first filter stage causes droplets of the first phase carried by the feed to coalesce into droplets of the first-coalesced characteristic size. This provides an intermediate feed which exits the first filter stage and to flow into a space between the first filter stage and the second filter stage 103. This intermediate feed may reside in this space for some intermediate feed residence time which may depend on the flow rate through the filter, the size of the gap between the two filter stages, and the flow cross sections of the two filter stages.

The intermediate feed then passes through the second filter stage 103. The second filter stage causes droplets of the first phase to coalesce again to droplets of a second-coalesced characteristic size. A coalesced feed exits the second filter stage and enters the gap 105 between the second filter stage and the selectively permeable barrier 104. This coalesced feed may reside in the gap for a so-called gap residence time. This gap residence time may depend on the flow rate through the filter, the size of the gap between the second filter stage and the selectively permeable barrier, the second flow cross section and the barrier cross section, and the permeability of the selectively permeable barrier.

The selectively permeable barrier 104 allows the outflow of the second phase and inhibits the outflow of the first phase. Consequently, the second phase exits the coalescing filter element 100 via the selectively permeable barrier 104 which also serves to inhibit re-entrainment of the droplets of the first phase into the outflow.

The first phase droplets in the coalesced feed settle under gravity towards the drain 108 during the predetermined gap residence time.

The gap residence time depends upon a number of factors with include the first phase droplet size, the drain cross section and the permeability of the selectively permeable barrier 104.

Varying each of the factors is considered below. In each case, it is assumed the other factors remain constant.

Increasing the first phase droplet size (e.g. the first phase comprising droplets of a greater characteristic size of the first phase) will decrease the time required for the first phase droplets to settle under gravity towards the drain 108 (e.g. larger droplets experience a difference balance of forces such as weight and drag) and thus will decrease the gap residence time. Correspondingly, decreasing the first phase droplet size will increase the time required for the first phase droplets to settle under gravity towards the drain and will thus increase the gap residence time.

Increasing the drain cross section will increase the flow rate of fluid which exits the gap 105 via the drain 108 (e.g. a greater surface area is available over which the fluid may pass) and thus will decrease the gap residence time. Correspondingly, decreasing the drain cross section will decrease the flow rate of fluid which exits the gap via the drain and thus will increase the gap residence time.

Increasing the permeability of the selectively permeable barrier 104 increases the flow rate of fluid which exits the gap 105 via the selectively permeable barrier 104 and thus decreases the gap residence time. Correspondingly, decreasing the permeability of the selectively permeable barrier decreases the flow rate of fluid which exits the gap via the selectively permeable barrier 104 and thus decreases the gap residence time.

In some examples, increasing the permeability of the selectively permeable barrier 104 may increase the radial speed of droplets of the first phase. The droplets of the first phase may be repelled at the selectively permeable barrier 104, thereby resulting in the droplets taking a "zig-zag" flow to the drain 108 which may increase the residence time of the droplets in the gap.

The "radial speed" may comprise the speed of droplets in the direction across the gap from the second filter stage towards the permeable barrier—e.g. in a truly radial direction in the case of a cylindrical filter element 100 (as described in examples herein) in a direction perpendicular to the axis A-A.

The "zig-zag" flow may refer to a path which comprises a combination of longitudinal motion (e.g. motion in a direction parallel to the axis A-A) and radial motion (e.g. motion in a direction perpendicular to the axis A-A), wherein the radial motion of the droplets changes direction at least once (e.g. the droplets first move away from the axis A-A and then secondly move towards the axis A-A).

Increasing the drain cross section reduces the gap residence time, but if increased too far the second phase may begin to exit the gap 105 via the drain 108.

Decreasing the drain cross section increases the gap residence time, but if decreased too far the first phase is re-entrained in the second phase and so exits the gap 105 via the selectively permeable barrier 104.

The drain cross section may be balanced against the permeability of the selectively permeable barrier 104 to reduce the likelihood of (e.g. avoid the possibility of) droplets of the first phase exiting the gap 105 via the selectively permeable barrier 104.

The drain cross section may be balanced against the permeability of the selectively permeable barrier 104 to reduce the likelihood of (e.g. avoid the possibility of) the second phase exiting the gap 105 via the drain 108.

Fluid in the gap 105 of the coalescing filter element 100 must leave the gap either via the selectively permeable barrier 104 or via the drain 108. Given a multi-phasic fluid feed which enters the coalescing filter element via the inlet aperture 107 with an initial concentration of the first phase in the second phase of $cfp_{initial}$, and, the final concentration of the first phase present in the second phase of $cfp_{initial}$, which exits the coalescing filter element via the selectively permeable barrier, then a separation efficiency may be defined as:

$$\text{separation efficiency} = \left(\frac{cfp_{initial} - cfp_{final}}{cfp_{initial}}\right) \times 100\%$$

The separation efficiency does not account for instances wherein the second phase exits the gap 105 via the drain 108. Therefore, care must be taken to ensure the second phase does not exit the gap 105 via the drain 108. One way of preventing this is to prioritise the selection of a short gap residence time by an appropriately selected drain cross section $A_{slot}$.

Care must be taken to ensure that a balance between these factors is found which provides a sufficient filtration efficiency.

The coalescing filter element 100 may be a prismatic shape, preferably being cylindrical shape. Coalescing filter elements having a prismatic shape may have a central longitudinal axis A-A. The inlet channel 101 may be located parallel to and coincident with the axis A-A. The first filter stage 102 may be arranged circumferentially around the inlet channel. The inlet channel may be defined as an interior volume delimited by the first filter stage. The second filter stage 103 may be arranged circumferentially around and spaced from the first filter stage. The selectively permeable barrier 104 may be arranged circumferentially around and spaced from the second filter stage 103 to form a gap 105 therebetween.

Optionally there may be provided additional filter stages.

The first filter stage 102 and the second filter stage 103 may have pleats which have a characteristic pleat depth. The pleats may be evenly spatially distributed along each of the first filter stage and the second filter stage. The first stage filter may have pleats with a greater pleat depth than the second stage filter which may provide a coalescing filter element wherein the first flow cross section is greater than the second flow cross section.

The first filter stage 102 and the second filter stage 103 may be formed of multi-layer non-woven filter media. Suitable multi-layer non-woven filter media may have pores with a mean pore size large enough to allow incident first phase droplets to penetrate the filter media so that the droplets become captured by the filter media. The mean pore size of a filter media is proportional to a characteristic size of droplets of a fluid coalesced by the filter media. The mean pore size of the first filter media may be within the range of 18 to 30 µm. The mean pore size of the second filter media may be within the range of 20 to 100 µm. The first filter stage comprises pores having a mean pore size which is smaller than a mean pore size of pores of the second filter stage.

The pore sizes described herein may comprise pore size measured according to a bubble point measurement or an open bubble measurement may be taken.

The bubble point test uses the principle that, for a given fluid and pore size, and with constant wetting, the pressure required to force an air bubble through a porous material is inversely proportional to pore diameter. The pressure required to force an air bubble through a porous material also depends on the surface tension of the test fluid. Often this may be referred to as capillary theory. The bubble point test may be used to infer the size of a largest pore (i.e. pore with greatest diameter) of a filter media.

An example method of conducting a bubble point test, is to wet the filter media with a fluid and then place the filter media in an airtight vessel containing air. The pressure of the air in the vessel is raised until a first bubble stream is emitted from an upper surface of the filter media. The pressure at which the first bubble stream is emitted is measured and is used to determine the pore size of the largest pore of the filter media.

A standard test procedure (ARP 901/ISO 4003) calls for isopropyl alcohol as the test fluid and that a 0.5 inch (Approximately 1.27 cm) thick layer of the test fluid is maintained over a top surface of the filter media. Another standard test procedure ISO 2942 calls for filter media to be immersed in isopropanol liquid where the height of isopropanol above the top of the filter media is 12±3 mm. Air pressure applied to the filter media is gradually increased and the pressure at which the first bubble stream is emitted is measured.

The bubble point test is conducted on both a filter media with a known largest pore size and a filter media with an unknown largest pore size. The pressure at which the first bubble stream is emitted is measured for both filter media.

Therefore, the pressure measurements are used to obtain a relative measure of the size of the single largest pore in the filter media with an unknown largest pore size.

For an air pressure, P, a pore diameter, d and contact angle θ, the Young Laplace equation can be used to calculate the pore size:

$$P = \frac{4\sigma \cos(\theta)}{d}$$

From Young Laplace, the largest pore size of the filter media with an unknown pore size may be determined.

The Open Bubble test or 10 LPM is a continuation of the bubble point test. After the first bubble stream is emitted from the filter media and the air pressure is measured, the air pressure is increased until a second bubble stream is emitted which corresponds to air passing through the second largest hole. The pressure is increased in a similar manner until a pressure is reached wherein air bubbles appear over the entire surface of the element. This pressure corresponds to an open bubble point. The open bubble is a relatively good measure of the mean pore size of a filter media.

The first-coalesced and second-coalesced characteristic sizes of droplets of the first phase may be proportional to the square root of the mean pore size of the first filter stage and the second filter stage respectively.

The desired flow rate, physical properties of the multi-phasic fluid such as dynamic viscosity, interfacial tension with the first phase, and characteristic droplet size of the first phase determine the number of layers of the filter media required. A combination of pore size and filter media thickness may be selected to provide a residence time of the first phase droplets, sufficient to allow the first phase to coalesce and settle to the filter media surface. The second filter stage may optionally be rolled.

The first and second filter stages 102, 103 may be selective for coalescing oleophilic fluids. The selectively permeable barrier 104 may be configured to be more permeable to oleophobic fluids than to oleophilic fluids.

For example, the first filter stage 102 may comprise glass fibre and the second filter stage 103 may comprise Nomex® and the permeable barrier comprises polypropylene.

The drain cross section may be selected based on the gap residence time. For example, the drain cross section may be decreased to increase the gap residence time. The drain cross section and the selectively permeable barrier cross section may be selected based on a volumetric flow rate of the multi-phasic fluid feed entering the coalescing filter element 100 via the inlet aperture 107. The drain cross section may be evenly spatially distributed about the second filter stage. The drain 108 may be formed of one or more slots. The one or more slots may have an arcuate shape. For example the drain may comprise plural slots, the slots may be identical in shape and area and may be located equidistantly in the housing 106 around the inlet channel 107. The sum of the area of the slots may be equal to the drain cross section.

For example, the coalescing filter elements 100 may be used to remove water from diesel fuel or to remove water from lube oil. For example, the coalescing filter elements, may be used in chemical processes wherein the removal of water from organic solvent streams. For example, the coalescing filter elements may be used to clean jet fuel.

Figure 2A:
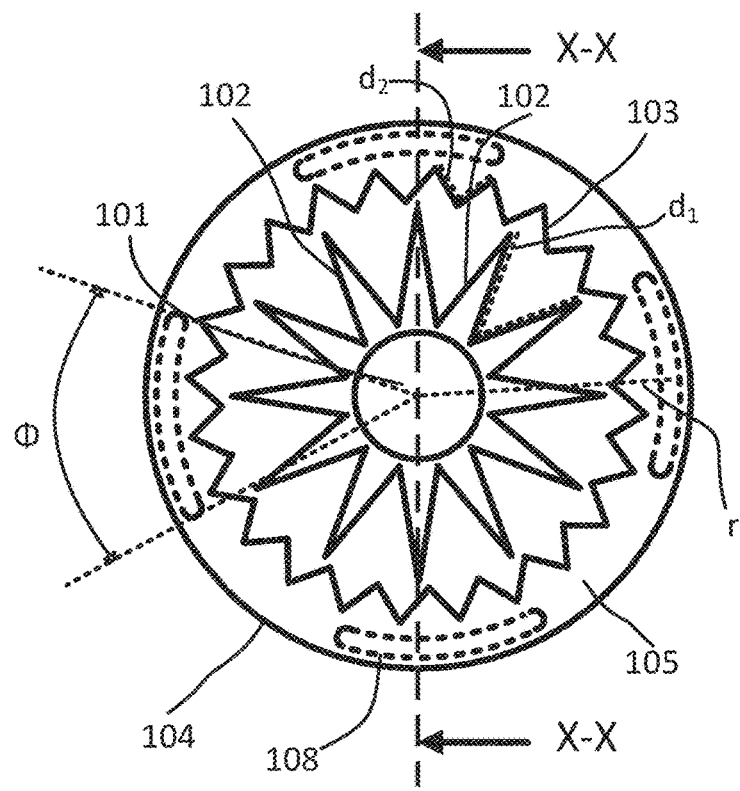
FIG. 2A is a cross-sectional view of the coalescing filter element of FIGS. 1A-1C along axis A-A.
Figure 2B:
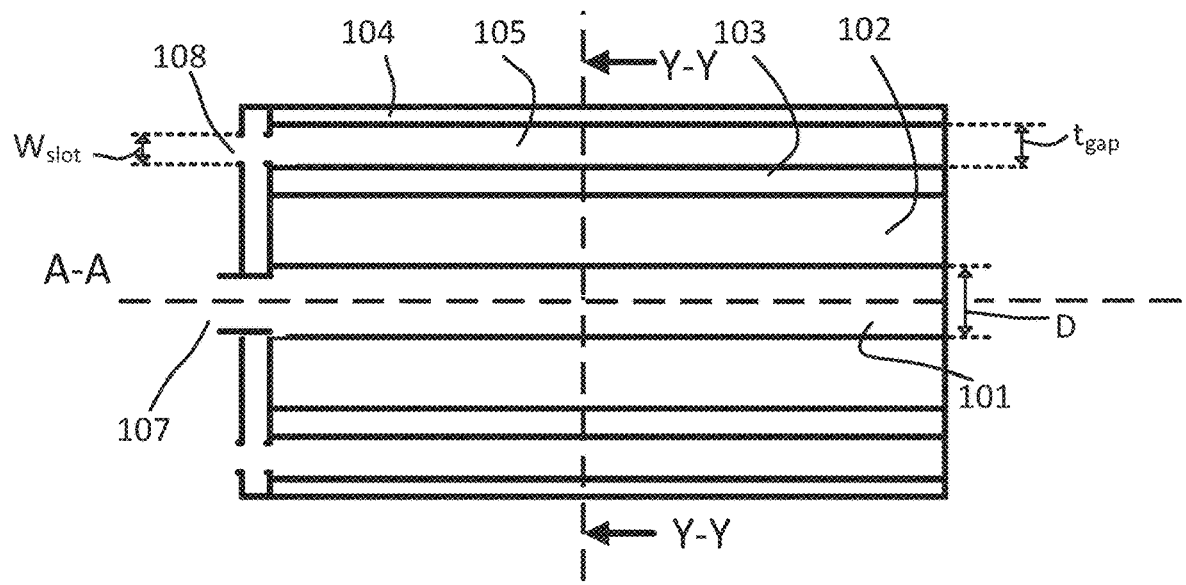
FIG. 2B is a cross-sectional view of the coalescing filter element of FIGS. 1A-1C along line X-X.

FIG. 2A shows a cross-sectional view of the coalescing filter element along axis A-A in the plane Y-Y also shown in FIG. 1B and FIG. 2B shows a cross-sectional view of the coalescing filter element in the plane X-X also shown in FIG. 1C.

As discussed above, the drain 108 may be formed of one or more slots. The one or more slots may have an arcuate shape. In embodiments with plural slots, the slots may be identical in shape and area and may be located equidistantly in the housing 106 around the inlet channel 107. The sum of the area of the slots is equal to the drain cross section.

FIG. 2A shows a cross-sectional view of the coalescing filter element 100 having a drain 108 comprising plural slots. The coalescing filter element has a radius r, a first filter stage pleat depth $d_1$, a second filter stage pleat depth $d_2$, and each slot has a slot length $l_{slot}$. The slot length may be defined as the product of the radius r and the total angle φ, subtended by a slot and the axis A-A, wherein the angle is in radians. This may be expressed mathematically as:

$$l_{slot} = r\Phi$$

The pleat depth of the pleated filter media described and claimed herein may comprise as the shortest distance along a filter media between two adjacent radially maximal points of the filter media. For example, the pleat depth may comprise the radial distance (e.g. in a filter stage which is circular) between adjacent peaks and troughs of the pleated media. The depth of individual pleats may differ, in which case the pleat depth may refer to the average (e.g. mean) or minimum pleat depth. The first filter stage pleat depth $d_1$ may be 5-13 mm. The second filter stage pleat depth $d_2$, may be 13.5 mm.

FIG. 2B shows a cross-sectional view of the coalescing filter element 100 having a slot width $w_{slot}$, an inlet aperture diameter D, and a gap thickness $t_{gap}$. For example, when the coalescing filter element 100 is configured to filter water (second phase) at a concentration of 0.2% by volume from diesel (first phase) at a multi-phasic fluid feed flow rate of 450 litres/hour, the slot length may be 10 mm, the slot width $w_{slot}$ may be 3 mm, and the inlet aperture diameter D may be 25 mm.

Figures 3A, 3B:
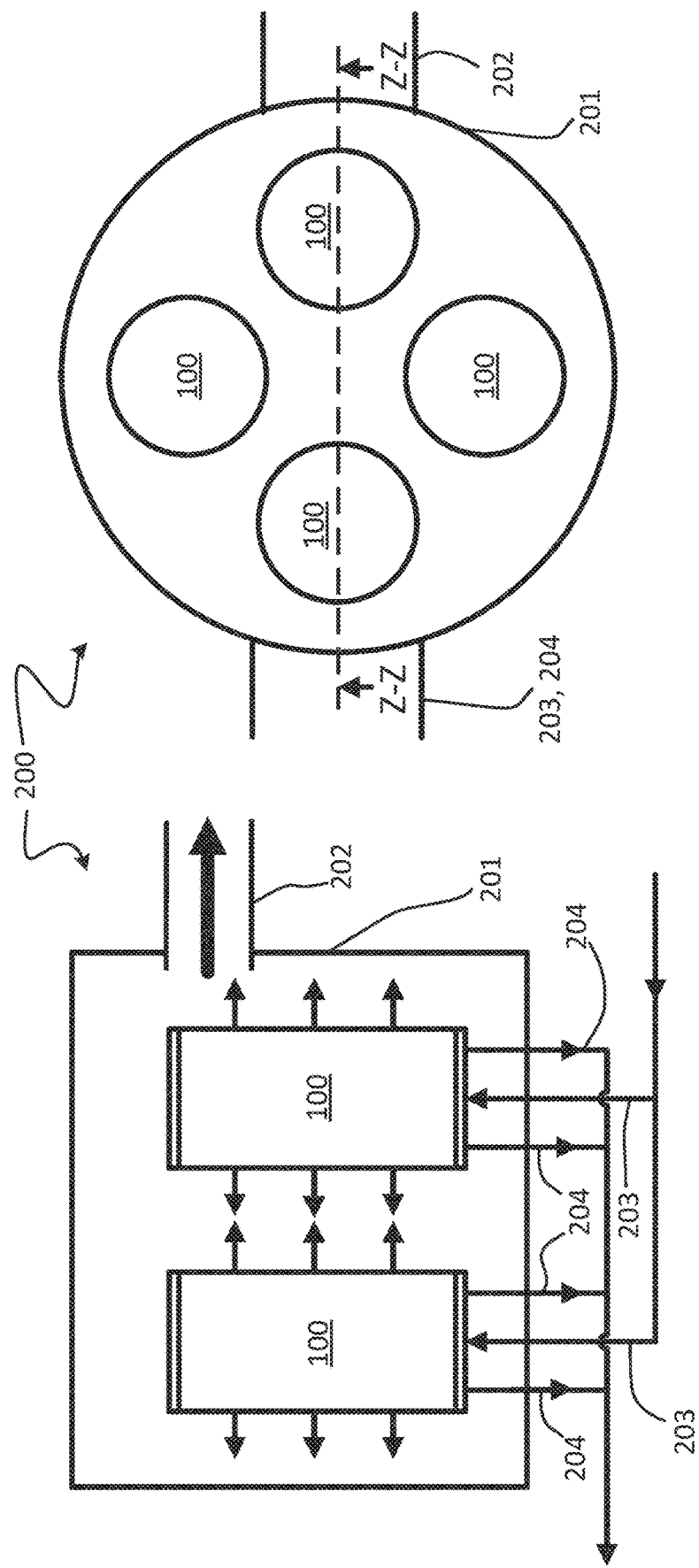
FIG. 3A is a simplified cross-sectional view of a filter system along line Y-Y.
FIG. 3B is a top-down view of the coalescing filter system.

FIG. 3A is a simplified cross-sectional view of a filter unit in the plane Y-Y.

FIG. 3B is a top-down perspective view of the filter unit.

FIG. 3 shows a filter unit 200 comprising a plurality of coalescing filter elements 100, a filter housing 201, a second phase outlet 202, a multi-phasic fluid feed manifold 203, a first phase manifold 204.

The plural coalescing filter elements 100 are arranged within an interior volume of the filter housing 201. The second phase outlet 202 is arranged in fluid communication with the interior volume of the filter housing. The multi-phasic fluid feed manifold 203 is arranged in fluid communication with the inlet channel 101 of each of the coalescing filter elements. The first phase manifold 204 is arranged in fluid communication with the drain 108 of each of the coalescing filter elements.

The multi-phasic fluid feed is configured to provide multi-phasic fluid feed to the inlet channel 101 of each the coalescing filter elements 101.

The first phase manifold is configured to receive a first phase of the multi-phasic fluid feed from the drain 108 of each of the coalescing filter elements 101.

The filter housing 201 has an interior volume which is configured to receive a second phase of the multi-phasic fluid which is output from the selectively permeable barrier 104 of each of the coalescing filter elements 101.

The second phase outlet is configured to remove the second phase of the multi-phasic fluid from the interior volume of the filter housing 201.

A filter unit 200 may be used to separate a first phase and second phase from a multi-phasic fluid feed. In use, each of the coalescing filter elements 100 are provided with a multi-phasic fluid feed from the multi-phasic fluid feed manifold 203 through the inlet aperture 107 into the inlet channel 101.

The coalescing filter elements 100 operate as described above with regards to FIGS. 1A-1C and 2A-B.

The second phase, which exits the coalescing filter elements 100 via the selectively permeable barriers 104, enters the interior volume of the filter housing 201. The second phase outlet 202 then removes the second phase from the interior volume of the filter housing.

The first phase, which exits each of the coalescing filter elements 100 via drains 108, enters the first phase manifold 204.

The first phase manifold 204 may be omitted. The first phase droplets which exits each of the coalescing filter elements 100 via drains 108, enters the interior volume of the filter housing 201. The speed of the second phase entering the filter housing via the selectively permeable barrier 104 and leaving the filter housing via the second phase outlet 202 may be maintained at a sufficiently low speed to avoid the entrainment of the first phase in the second phase.

Embodiments of the present disclosure provide a method for determining optimal physical parameters of a coalescing filter element for separating a feed of multi-phasic fluid comprising a first phase and a second phase such as an aqueous phase and a non-polar (e.g. hydrocarbon) phase. For given filter stage media (e.g. first filter stage comprising glass fibers and a second filter stage comprising Nomex®), a given desired throughput and a given filter shape and size (e.g. cylindrically shaped with a given selectively permeable barrier cross section and a given radius). The coalescing filter element is configured: to receive the feed via an inlet channel; to permit outflow of the first phase via a drain; and, to permit outflow of the second phase via a selectively permeable barrier.

The design of a coalescing filter elements such as any of the filter elements described or claimed herein may require the selection of a gap residence time, and/or the gap size and drain cross section according to the intended use of the filter. Characteristics of the barrier may also be used to control/adjust gap residence time.

A coalescing filter element with a structure such as these described with reference to FIGS. 1 and 2 can be adapted for a wide variety of applications. For example a coalescing filter element used for removal of water from diesel may require different parameters than a coalescing filter element used for removal of water from other organic solvent streams. The applicant recognises that there exists a principle capable of general application wherein, filters having the structural features described elsewhere herein may be defined by the gap between the second stage and the barrier, and the cross section of the drain. These characteristics of the filter may be chosen based on characteristics of a multi-phasic fluid feed, such as: the target total volumetric flow rate of the fluid feed into the filter element, $Q_{IN}$; the dynamic viscosity, $\mu$, of a multi-phasic fluid feed; and, the density, $\rho$, of the multi-phasic fluid feed. Knowing these parameters, a desired residence time in the gap and the target outflow rate from an output of the filter element, $Q_{barrier}$; and, the target outflow rate of the first phase from a drain of the filter, $Q_{slot}$; can be determined (e.g. based on knowledge of the proportion of the two phases). This can enable a gap size and a drain cross section to be selected and the filter element can be designed to have these structural characteristics in order to provide separation of multi-phasic flow having the relevant characteristics.

It will be appreciated in the context of the present disclosure that, in filter elements such as those described and claimed herein the gap size and of the drain cross section determine a gap residence time. A suitable gap residence time allows for a first phase to settle due to gravity towards a drain of the filter element and therefore prevents re-entrainment of the first phase within the second phase as the second phase exits the filter element via a selectively permeable barrier. Therefore, appropriate selection of the gap size and of the drain cross section allow for a filter element with a high filtration efficiency to be realised.

Figure 4:
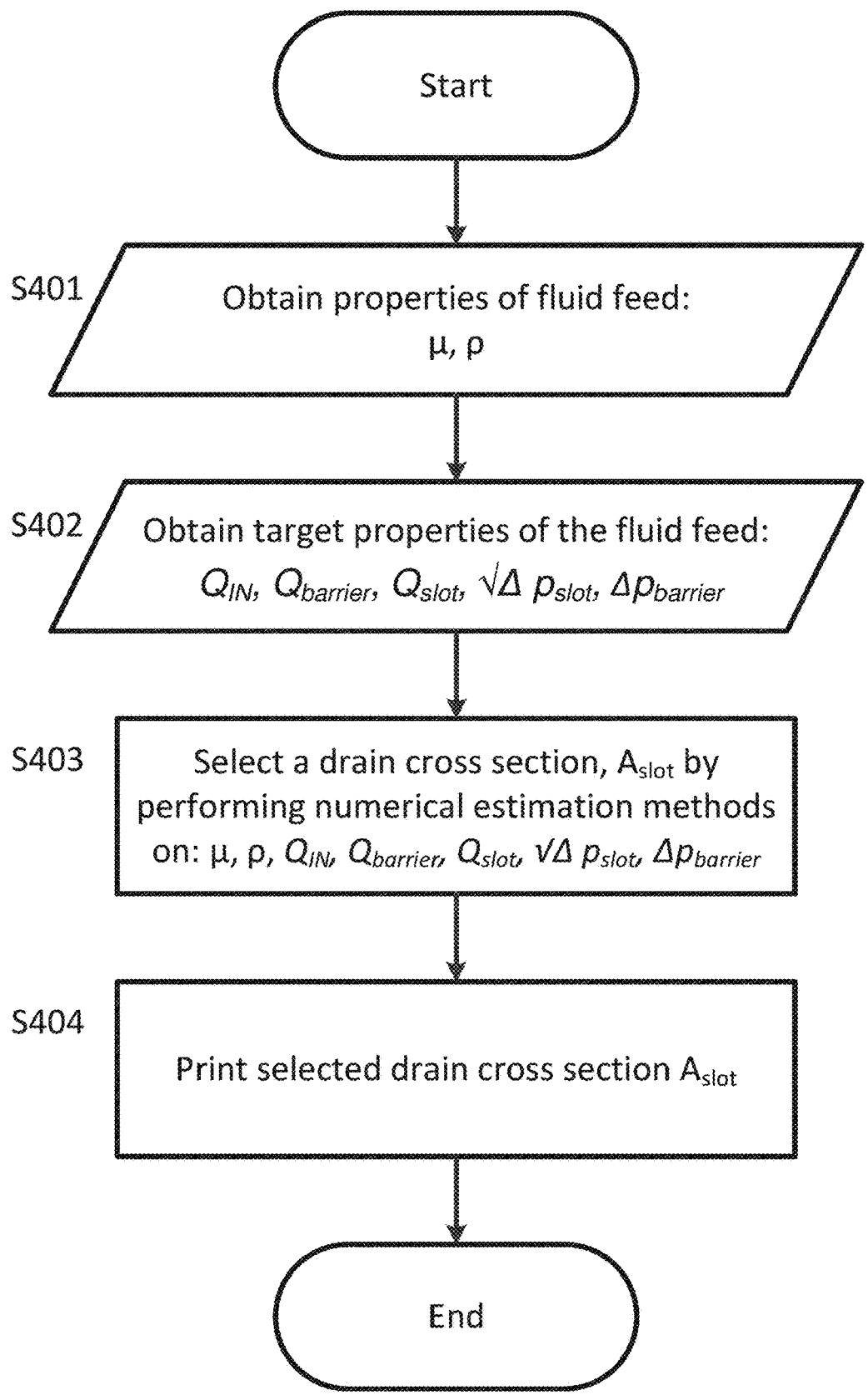
FIG. 4 is a flowchart depicting a method of designing a filter element.

The method of designing a coalescing filter element for separating components of a fluid feed will now be described with reference to FIG. 4.

The method may be implemented by a computer. The computer is: configured to obtain data indicative of physical characteristics of a filter element and may perform one or more numerical estimation methods on the data; and, configured to output data indicative of physical characteristics of a filter element which are arrived at through the numerical estimation method. The numerical estimation methods may be performed in accordance to any of the principles laid out in Numerical Recipes in C: The Art of Scientific Computing, for example, the conjugate gradient method. The numerical estimation method may be goal-seeking.

The computer obtains S401, data indicative of both, a dynamic viscosity, $\mu$, of a multi-phasic fluid feed to be filtered, and a density, $\rho$, of the multi-phasic fluid feed.

Optionally, in the first step S401, a number of slots which comprise the drain may be chosen, and a slot width $w_{slot}$ may be chosen.

The computer obtains S402, data indicative of, a target total volumetric flow rate of the fluid feed into the filter element, $Q_{IN}$. It may also obtain data indicative of a target outflow rate from an output of the filter element, $Q_{barrier}$, and a target outflow rate of the first phase from a drain of the filter, $Q_{slot}$.

Optionally, the second step S402 further comprises, obtaining, by the computer, data indicative of, the square root of a pressure change of the fluid passing through the slot $\sqrt{\Delta p_{slot}}$, and/or a pressure change of the fluid passing through the slot $\Delta p_{barrier}$.

Optionally, the second step S402 may be performed before the first step S401.

The computer selects S403 the drain cross section $A_{slot}$ by performing one or more operations on the obtained values of:

the dynamic viscosity, $\mu$, of a multi-phasic fluid feed;
the density, $\rho$, of the multi-phasic fluid feed;
the target total volumetric flow rate of the fluid feed into the filter element, $Q_{IN}$;
the target outflow rate from an output of the filter element, $Q_{barrier}$;
the target outflow rate of the first phase from a drain of the filter, $Q_{slot}$.

To select the drain cross section, $A_{slot}$, the computer may operate under any of the following constraints.

The area $A_{slot}$ may be selected/modelled in a variety of ways. For example, the number of slots and the width of the slots may be determined at step S401. The drain cross section $A_{slot}$ may then be determined by the length of the slots $l_{slot}$. Therefore, optionally S403 may include selecting a slot length $l_{slot}$, which determines the drain cross section.

Optionally, in step S403 the drain cross section may be selected based on a calculated actual flow distribution through the drain and the barrier based on the pressure change constraint ($\Delta p_{barrier} = \Delta p_{slot} + \Delta p_{gap}$).

The pressure change across the drain, $\Delta p_{slot}$, may be calculated based on, for example: the pressure constraint ($\Delta p_{barrier} = \Delta p_{slot} + \Delta p_{gap}$); the slot length $l_{slot}$; slot width $w_{slot}$; the dynamic viscosity, $\mu$, of a multi-phasic fluid feed; the density, $\rho$, of the multi-phasic fluid feed; the permeability of the selectively permeable barrier.

Optionally, in step S403 the computer further utilises data indicative of, the square root of a pressure change of the fluid passing through the slot $\sqrt{\Delta p_{slot}}$, and/or a pressure change of the fluid passing through the slot $\Delta p_{barrier}$.

The computer may firstly operate under the constraint that the target total volumetric flow rate of the fluid feed into the filter element, $Q_{IN}$, must be equal to the sum of: the target outflow rate from an output of the filter element, $Q_{barrier}$; and, the target outflow rate of the first phase from a drain of the filter, $Q_{slot}$. This may be expressed mathematically as:

$$Q_{IN} = Q_{slot} + Q_{barrier}$$

For a given drain cross section, the volumetric flow rate of the fluid feed exiting the gap via the drain, $Q_{slot}$, may be subject to the constraint that the pressure change across the selectively permeable barrier, $\Delta p_{barrier}$, must be equal to the sum of: the pressure change across the drain, $\Delta p_{slot}$ and, the pressure change across the gap, $\Delta p_{gap}$. The computer may additionally operate under this constraint when determining the target outflow from the drain of the filter, $Q_{slot}$. The constraint may be expressed mathematically as:

$$\Delta p_{barrier} = \Delta p_{slot} + \Delta p_{gap}$$

The computer may also obtain data indicative of a ratio by mass of a first phase to a second phase.

Then, the computer may obtain data indicative of the target outflow rate of the first phase from a drain of the filter, $Q_{slot}$, by performing operations on: the target total volumetric flow rate of the fluid feed into the filter element, $Q_{IN}$; the density, $\rho$, of the multi-phasic fluid feed; and, the ratio by mass of the first phase to the second phase.

Subsequently, the computer may obtain data indicative of the target outflow rate from an output of the filter element, $Q_{barrier}$, by finding the difference between the obtained values of $Q_{IN}$ and $Q_{slot}$.

Optionally, the computer may operate under any of the following constraints wherein, the target outflow rate from an output of the filter element, $Q_{barrier}$, is: directly proportional to the pressure drop of a fluid passing through the barrier; directly proportional to the barrier cross section; directly proportional to the dynamic viscosity, $\mu$, of a multi-phasic fluid feed.

Optionally, the computer may operate under the following constraint wherein, the target outflow rate of the first phase from a drain of the filter, $Q_{slot}$, is: directly proportional to the square root of the pressure change of the fluid passing through the slot $\sqrt{\Delta p_{slot}}$. To select the drain cross section, the computer may operate under any of the following constraints wherein, the drain cross section $A_{slot}$ is: directly proportional to the target outflow rate of the first phase from a drain of the filter, $Q_{slot}$; and/or, directly proportional to the density, $\rho$, of the multi-phasic fluid feed; and/or, inversely proportional to the square root of the pressure change of the fluid passing through the slot $\sqrt{\Delta p_{slot}}$.

Optionally, the computer selects the drain cross section, $A_{slot}$, based on data indicative of parameters of a selectively permeable barrier for inhibiting re-entrainment of coalesced droplets of the first phase in fluid outflow from the output of the filter element (e.g. via the selectively permeable barrier) which may be obtained by the computer and used in the method to select the drain cross section, $A_{slot}$.

Parameters of the selectively permeable barrier may include the barrier cross section, $A_{barrier}$, the permeability of selectively permeable barrier to hydrophobic fluids and/or hydrophilic fluids.

Optionally, the computer may operate under the following constraint wherein, the target outflow rate from an output of the filter element, $Q_{barrier}$, is: directly proportional to; the barrier cross section $A_{barrier}$.

Optionally, the computer selects the drain cross section, $A_{slot}$, based on a target pressure change across the selectively permeable barrier, $\Delta p_{barrier}$ which may be obtained by the computer and used in the numerical estimation method to select the drain cross section, $A_{slot}$. For example, the constraint described above, expressed mathematically as: $\Delta p_{barrier} = \Delta p_{slot} + \Delta p_{gap}$, may be used to select the drain cross section, $A_{slot}$.

Optionally, the computer may operate under the constraint that the target outflow rate from an output of the filter element, $Q_{barrier}$, is: directly proportional to the target pressure change across the selectively permeable barrier, $\Delta p_{barrier}$. For example, the constraint described above, expressed mathematically as: $\Delta p_{barrier} = \Delta p_{slot} + \Delta p_{gap}$, may be used to select the drain cross section, $A_{slot}$.

The computer may operate under other constraints which are implicitly described herein.

The computer prints S404. Alternatively, the printed data is indicative of the drain cross section $A_{slot}$.

The computer implemented method described herein may be used to determine physical characteristics of plural filter elements to be used in parallel.

The computer implemented method may be used to design coalescing filter elements comprising two filter stages, arranged in series, for coalescing the droplets of the first phase and a gap disposed between a second one of the two filter stages and the selectively permeable barrier, wherein the drain is provided in a base of the filter element and in the gap.

The coalescing filter element 100 according to the first aspect of the disclosure may comprise a drain having a drain cross section selected by the computer implemented method.

The first phase may be aqueous and the second phase may be organic, for example wherein the second phase is one of diesel and lube oil.

The computer may obtain any of the above data by a variety of ways. These include, calling the data from memory and manual input of the data by a user of the method.

The data may also be received via a communication interface such as over a network or where appropriate direct measurement may be performed by appropriate measurements. For example direct measurements of the dynamic viscosity, $\mu$, and the density, $\rho$, of the fluid feed may be taken by the use of appropriate measurement apparatus. For example, a viscometer or a rheometer or the like to measure the dynamic viscosity, $\mu$, of the multi-phasic fluid feed. For example a hydrometer or the like to measure the density, $\rho$, of the multi-phasic fluid feed. Alternatively, indirect measurements of the dynamic viscosity, $\mu$, and the density, $\rho$, of the fluid feed may be taken by the use of appropriate measurement apparatus. For example, by measuring the temperature and pressure of the fluid feed, the dynamic viscosity, $\mu$, and the density, $\rho$, of the fluid feed may be determined using standard reference data or the like.

The target volumetric flow rate of the multi-phasic fluid feed received by the coalescing filter element $Q_{IN}$, via the inlet aperture. This value may be predetermined by pre-existing hardware within which the filter elements designed by the computer implemented method are to be fitted.

For example, the pre-existing hardware may comprise a pump configured to supply a multi-phasic fluid feed to a coalescing filter element. The pump may have a set output volumetric flow rate. Accordingly, the target volumetric flow rate of the multi-phasic fluid feed received by the coalescing filter element, $Q_{IN}$, would be equal to the pump output volumetric flow rate. Similarly, the pre-existing hardware may comprise pump configured to supply a multi-phasic fluid feed to N coalescing filter elements disposed within a filter housing. In this case, the target volumetric flow rate of the multi-phasic fluid feed received by each of the coalescing filter elements, $Q_{IN}$, would be equal to a $Q_{IN}/N$.

The target outflow rate from an output of the filter element may be considered to be a target volumetric flow rate of the second phase output via the selectively permeable barrier 104, $Q_{barrier}$, and the target volumetric flow rate of the first phase output via the drain 108 comprised of slots, $Q_{slot}$.

As stated above, in the steady state the $Q_{Total} = Q_{barrier} + Q_{slot}$ and therefore when the coalescing filter elements are operated in the steady state the volumetric flow rate of the second phase output via the selectively permeable barrier 104, $Q_{barrier}$, and the target volumetric flow rate of the first phase output via the drain 108 comprised of slots, $Q_{slot}$ are constrained.

The computer implemented method may operate on the obtained data in accordance with any of the following equations:

$$\Delta p_{Barrier} = \frac{R\mu Q_{barrrier}}{A_{barrier}}$$

$$Q_{slot} = C_d A_{slot} \frac{\sqrt{\Delta p_{slot}}}{\rho}$$

$$Q_{IN} = Q_{barrier} + Q_{slot}$$

Where R [1/m]: Resistance of the selective permeable barrier $\mu$[Kg/m·s]: Dynamic viscosity of the multi phasic feed $\rho$[Kg/m$^3$]: Density of the multi phasic feed $C_d$[–]: Discharge coefficient In these and other embodiments modelling may also be performed according to the present disclosure. For example the models described herein may be employed in the computer implemented methods of designing a coalescing filter element as described and claimed herein.

Such methods may comprise (1) determining clean and steady state pressure drop for multi-stage filters (2) determining porosity at steady state condition, $\phi_{SS}$, e.g. using a continuity equation (3) and determining permeability, K, of the filter media, before designing a filter and/or determining the operating conditions of a filter having such porosity and permeability drops thereby to provide said clean and steady state pressure drops. Such methods may further comprise manufacturing a filter element having said characteristics One example of such a method may proceed as follows.

2.1. Determination of Clean and Steady State Pressure Drop for Multi-Stage Filters For multi stage filters, pressure drop of a water-diesel/lube oil separator under clean conditions can be calculated using Darcy's equation as given by Eq. (1).

$$\Delta P_i = \mu_i L_i V_i / K_i \quad (1)$$

where, $\Delta P_i$ represents the pressure drop across the porous media i, $\mu_i$, is the dynamic viscosity of the continuous fluid, $V_i$, is the velocity of the continuous fluid, $L_i$, is the length of the porous media, and $K_i$, is the coefficient of permeability of the porous media.

The water-diesel separation prototype investigated in this work comprises multiple stages. In this case, Darcy equation can be applied to each stage, and the total pressure drop can be calculated by adding the individual pressure drop contribution of every stage as depicted in Eq. (2).

Equations (1) & (2) are useful for calculating the pressure drop for initial or clean conditions only. When the water-diesel/lube oil separator is in an actual operation, water will be captured within the filter media and as a result, the porosity of the filter media decreases, consequently, the pressure drop may increase with time as shown in FIG. 5.

Unlike solid particles, the pressure drop of a liquid-liquid separator does not increase indefinitely. Water droplets coalesce with each other on the fiber surface and dragged by the continuous phase flow to the rear side of the filter media, where they settle down by gravity. A steady state will be established, where the incoming water with the diesel is transported through the filter and removed from the filter. As a result, the pressure drop eventually stabilizes. The pressure drop $\Delta P_{clean}$, at t=0, is calculated by applying Eq. (2), while the pressure drop under steady state, $\Delta P_{steady\ state}$, requires $\Delta P_{Loading}$ to be calculated. The calculation of $\Delta P_{Loading}$ is carried out utilizing a form of Karman-Cozney equation as shown by Eq. (3), which provides relationship between porosity and the pressure drop. This enables to calculate the $\Delta P_{Loading}$ as a function of $\Delta P_{clean}$ as presented in Eq. (4). This is possible because except for porosity, other parameters in Eq. (3) remain unchanged. The porosity at clean conditions can be calculated based on the characteristics of the filter media such as, basis weight and thickness using Eq. (5). The porosity change during water loading to the filter is calculated from the weight change of the filter that is expected from water capture. The weight change is converted to water volume and this represents the quantity of water present within the filter. The ratio of this volume to the total volume of the filter provides the magnitude of the porosity reduction resulting from water capture. The final steady state pressure drop requires a steady state porosity that depends among other filter media characteristics on the wettability of the filter media, i.e., hydrophilic or hydrophobic. When possible, this should preferably be determined from experimental tests. Nevertheless, there are some empirical correlations in literature to roughly estimate the equilibrium liquid saturation level. For example, Eq. (6) can be used. Note that these correlations were determined for the gas-liquid coalescing applications, so calculated values can significantly deviate from practical observations.

$$\Delta Pclean,\ SS = \frac{180\mu UL(1-\Phi)^2}{\phi_S^2 D_f^2 \Phi^3} \quad (3)$$

Where, Df is fiber thickness $$\frac{\Delta P_{clean}}{\Delta P_{Loading}} = \frac{(1-\Phi_i)^2}{(1-\Phi_{SS})^2} \frac{\Phi_{SS}^3}{\Phi_i^3} \quad (4)$$

$$\Phi_i = \left(1 - \frac{G}{\rho_{media} L}\right) \quad (5)$$

$$S = cN_{ca}^{-0.264} \quad (6)$$

where, $$N_{ca} = \frac{\mu U}{\sigma_{wd}} \quad (7)$$

2.2. Determination of Porosity at Steady State Condition, $\phi_{SS}$, e.g. Using Continuity Equation To calculate the effect of adsorption of water content by filter media, porosity of the filter media at steady state, Oss, or at saturation conditions can be determined. Usually, porosity of filter media from manufacturers is rated for clean conditions and not for steady state condition. In this section, there is an attempt to quantify the porosity at steady state condition using the continuity equation by calculating the amount of water adsorbed for each of the filter media stages of the two filter prototypes. Consider porosity equations, (8) and (9) below that represent the porosity for the clean and the porosity for steady state conditions:

$$\Phi_i = \frac{(V_{Pi})}{(V_t)} \times 100\% \quad (8)$$

$$\Phi_{SS} = \frac{(V_{SS})}{(V_t)} \times 100\% \quad (9)$$

where, $\phi_i$, is the porosity of filter media at the clean condition as received, $\phi_{SS}$, is the porosity of filter media at the steady state condition, $V_{pi}$, is the volume of the pore at the clean conditions, $V_{SS}$, the volume of the pore at the steady state condition or at saturation, and $V_t$, is the total volume of the filter media Initially, for clean filter media conditions, $V_{Pi}$ ideally equal to a very small portion of the filter media and during filtration and because of the adsorption of the filter media, the pore volume of the filter media starts contaminating with water. In order to quantify the amount of water that are captured or contaminated by filter media and to calculate the correspond new porosity for each layer, it is recommended to consider the steady state condition and saturation for filter media for which pressure drop will be saturated and constant beyond this point. The steady state condition can be obtained from the experimental tests of ISO 16332 Method by observing at what point the pressure drop will be saturated or constant.

To find the porosity at the steady state condition, $\phi_{SS}$, Eq. (10) can be written as function of $\phi_i$ and the volume of water that is adsorbed by the filter media:

$$\phi_{SS} = \phi_i - (V_{ad}/V_t) \qquad (10)$$

where, $V_{ad}$, is the water volume amount that adsorbed by the filter media, and it can be determined by the conservation of mass of the water for the total filter media.

$$\dot{m}_{in} = \dot{m}_{ad} + \dot{m}_{out} \qquad (11)$$

where, $\dot{m}_{in}$, $\dot{m}_{ad}$ & $\dot{m}_{out}$, are the water mass rate enters, the water mass rate adsorbed by the filter media and water mass rate exits the filter media, respectively. Assuming; constant density for all masses and steady state condition, Eq. (11) yields, $$V_{in} = V_{ad} + V_{out} \qquad (12)$$

$V_{in}$, is the amount of water injected to the filter and it can be measured experimentally, and $V_{out}$, is the amount of water either drained or entrained with the diesel fuel. Therefore, $V_{out}$ can be written as:

$$V_{out} = V_{drained} + V_{entrained} \qquad (13)$$

$V_{drained}$, is the amount of water drained from the filter and it is measured experimentally, and $V_{entrained}$, is the amount entrained by the diesel fuel and can be calculated by the following equation:

$$V_{entrained} = \frac{dV_{in}}{dt}.t.(1-\eta) \qquad (14)$$

where, $\frac{dV_{in}}{dt}$, is the water injection rate, t, is the time duration of the test, and $\eta$, is the removal of water efficiency for the filter. $\phi_{SS}$, the porosity of filter media at the steady state condition can thus be determined based on Eq. (15), $$\phi_{SS} = \phi_i - \frac{\left(V_{in} - V_{drained} - \left(\frac{dV_{in}}{dt}.t.(1-\eta)\right)\right)}{(V_t)} \qquad (15)$$

2.3 Determining Permeability, K, of the Filter Media

Permeability of filter media may be quoted by filter media manufacturer for flat sheets of the filter media and may be calculated based on air pressure of 200 Pa. In order to calculate the permeability for filter media in design and simulation methods according to the present disclosure, the permeability for flat sheet media may be converted to the permeability for each filter media (e.g. filter stage) according to Eq. (16), $$K = \frac{Q\mu\left(\ln\left(\frac{R_{end}}{R_{begin}}\right)\right)}{2\pi H \Delta P} \qquad (16)$$

where $R_{end}$ is the drainage radius, $R_{begin}$, is the wall bore radius, and H is the height of the filter media. $\Delta P$, can be calculated based on Darcy's equation as depicted in Eq. (1) FIG. 6 shows a schematic diagram for a cross section of a filter element having two filter stages and an indication of the flow and some of the parameters of the equations above.

FIG. 7 shows two filter stages of arrangements which were simulated. Two prototype arrangements of this type were simulated but constructed from different filter media. The two diesel prototype models were built using 3D CFX Ansys tool and they were simulated for different flow rates as it will be covered later. Each of the two concepts has two different stages and the construction of each stage of the filter media type are depicted in Table 1, below.

TABLE 1

| Prototype No. | 1st stage | 2nd stage |
|---|---|---|
| Prototype 1 | Pleated polyfibre-1 | Wrapped polyfibre-1 |
| Prototype 2 | Pleated polyfibre-2 | Wrapped polyfibre-3 |

The characteristics of the filter media that were used to build the construction of the aforementioned two prototypes for the CFD modelling are depicted in Table 2. According to filter media manufacturer, the filter media have permeability values reported in Table 2. These were measured at air pressure of 200 Pa as a reference. It should be mentioned here that the permeability, K, and the clean porosity, $\phi_i$, characteristics as received from the filter media manufacturers represent only clean conditions.

TABLE 2

| Characteristics of the filter media specifications (as quoted by filter media manufacturers) | | |
|---|---|---|
| Filter media type and pore size in µm | Permeability, K (m²) | Porosity, $\Phi i$ |
| Polyfiber-1 | 9.1767E−12 | 0.9055 |
| Polyfiber-2 | 9.70251E−12 | 0.9096 |
| Polyfiber-3 | 8.30247E−11 | 0.9284 |

Porosity values that are reported in Table 2 above represent the clean filter media. The corresponding pressure drop across the filter may be obtained from the CFD simulation, e.g. solely for the clean conditions. However, for the steady state condition this may not be the most accurate assumption. Filter media will adsorb the water droplets during the migrating of the dispersed of the water droplets with the continuous diesel fluid through the filter media. Therefore, new porosity values may be considered and accounted for the contaminated filter media. There is an attempt in this research to quantify of the porosity at steady state condition using the continuity equation as it was detailed in the analytical section. The steady state porosity, $\phi_{SS}$, represents the porosity of filter media at saturation and it can be used to estimate the pressure drop of the filter media in the CFD simulation in the steady state conditions.

The domain was discretized with CFX Ansys meshing using Finite Volume Method with fine mesh. Table 3 shows the mesh specifications, and FIG. 8 sketches the mesh structure for stages 1 and 2. Based on several runs, it was decided that the number of elements depicted in Table 3 was the optimized number to be used for the two prototypes and all flow rates.

TABLE 3

| Element Type | Num. Elements | Num. Nodes | Max. Size | Curvature | Edge Sizing | Growth Rate |
|---|---|---|---|---|---|---|
| Hexes | 161460 | 173712 | 0.025 | 18° | 0.063 m | 1.2 |

For the prototype design as depicted in FIG. 7, a total of 10 runs for 5 different flow rates were simulated and these are shown in Table 4. Simulations were conducted for each of the flowrates under clean and steady state conditions. The boundary conditions for the two filter prototypes were used according to each inlet velocity conditions at the inlet core Port A as shown in Table 4. The diameter of the inlet core of the filter is 20 mm and it was fixed for all simulations. The value of the inlet of the velocity was calculated for each flow rates. The amount of the water that was injected to the diesel system was in the range of 2000±50 ppm, and the average water droplet size were ranged between, d50=11-13 µm. Transport properties of the continuous phase diesel and for the dispersed phase water at room temperature with an interfacial tension (IFT) of 0.016 N/m were depicted in Table 5. For each simulation using the inlet diameter of the filter, the inlet velocity, Vin, can be calculated using Eq. (17).

$$V = \frac{Q}{A} \quad (17)$$

where, Q, is the flow rate and A is the cross sectional area of the inlet of the filter as shown in Port A in FIG. 7.

TABLE 4

Boundary conditions for a mixture of
2000 ppm of water in diesel, $d_{50}$ = 13 µm.

| Simulation No. | Prototype No, | Flow Rate (L/hr.) | Inlet Velocity $V_{in}$, (cm/sec) |
|---|---|---|---|
| 1 | Prototype 1 | 50 | 4.4 |
| 2 | Prototype 1 | 90 | 8.0 |
| 3 | Prototype 2 | 50 | 4.4 |
| 4 | Prototype 2 | 100 | 8.8 |
| 5 | Prototype 2 | 200 | 17.7 |

In these arrangements Prototype 2 was arranged as a coalescing filter element for separating a multi-phasic fluid comprising a first phase and a second phase. The filter element of Prototype 2 comprised: a first filter stage for coalescing the first phase to provide an intermediate feed, a second filter stage for coalescing the first phase from the intermediate feed, a selectively permeable barrier which permits outflow of the second phase and inhibits outflow of the first phase, and a drain arranged between the second filter element and the selectively permeable barrier to allow outflow of the first phase. In Prototype 1, by contrast the selectively permeable barrier, and drain between the second filter element and the selectively permeable barrier were both absent.

TABLE 5

Transport properties for the water and diesel mixtures

| Fluid components | Density, (ρ), Kg/m3 | Dynamic Viscosity, (µ), Pa · sec |
|---|---|---|
| Diesel (continuous phase) | 821 | 0.00290 |
| Water (dispersed phase) | 997 | 0.00089 |

In these simulations boundary conditions of the inlet velocity, $V_{in}$, of Table 4 above was assigned as the inlet velocity at the core of the filter.

Solver Settings

Based on calculated Reynolds number for a presentative pipe flow of the inlet of the filter with an inlet diameter of 20 mm as shown in Table 4, transient flow model simulation was selected to represent the fluid dynamic motion inside the filter for all simulations. A dispersed water droplets size of 13 µm mixed in a continuous diesel fluid using the particle model with Schiller Naumann as the drag force was selected. It should be mentioned here that these models were conducted for steady state conditions as well and results were very similar to the transient simulation.

Experimental tests were conducted using the water-diesel separation test rig at the International Filter Testing Services (IFTS), in France. FIG. 9 depicts the experimental setup according to ISO standard 16332. It comprises fuel and water tanks, water and fuel pumps, an orifice to create the dispersion of water droplets in diesel fuel, a test filter and a final water separation filter. Diesel fuel CEC RF 0603 processed with sepiolithem, Monoolein and water were used as continuous and dispersed phases, respectively. The flow of diesel fuel was varied between 50-200 L/h as shown in Table 4. The temperature was kept at 23° C.+2° C. and the interfacial tension (IFT) of 16 mN/m was measured. The water flow was adjusted to 0.2% (w/w) or 2000 ppm of the total flow and was injected just before the orifice plate. This breaks up the water into water droplet sizes of an average d50 of 11-13 µm and forms an emulsion of water in diesel. The test according to ISO standard 16332 will run for a full of 90 minutes unless the filter gets clogged, which generates high pressure drop across the filter, thus forces the test to stop. The pressure drops across the filter prototypes were measured every 10 minutes. The measured final pressured drop at the end of the experiment was correlated with the pressure drop computed from the CFD simulation model at the steady state condition. Additionally, the filtration efficiency of the prototypes was measured by measuring the water concentration upstream and downstream of the filter.

The flow of diesel fuel was varied between 50-200 L/h as shown in Table 6. The temperature was kept at 23° C.+2° C. and the interfacial tension (IFT) of 16 mN/m was measured.

TABLE 6

Test conditions for the ISO standard 16332 test
Method a mixture of 2000 ppm of water in diesel, $d_{50} = 13$ μm.

| Simulation No. | Prototype No, | Flow Rate (L/hr.) |
|---|---|---|
| 1 | Prototype 1 | 50 |
| 2 | Prototype 1 | 90 |
| 3 | Prototype 2 | 50 |
| 4 | Prototype 2 | 100 |
| 5 | Prototype 2 | 200 |

Experimental performance results such as the pressure drop and filtration efficiency of the two prototypes at the clean and the steady state conditions are depicted in Table 7. The pressure drop of the two prototypes at clean conditions was obtained from the experiment after 10 minutes of the experiment, whereas the pressure drop at steady state conditions was retrieved after 90 minutes of the experiment or when the test stops.

TABLE 7

Experimental results for the two prototypes at different flow rates.

| Simulation No. | Prototype No, | Flow Rate (L/hr.) | Clean Pressure drop, (KPa) | Steady State Pressure drop, (KPa) | n % Average Filtration Efficiency |
|---|---|---|---|---|---|
| 1 | Prototype 1 | 50 | 17.0 | 29.7 | 17 |
| 2 | Prototype 1 | 90 | 40.1 | 49.3 | 0 |
| 3 | Prototype 2 | 50 | 2.2 | 3.1 | 100 |
| 4 | Prototype 2 | 100 | 5.1 | 6.7 | 99.8 |
| 5 | Prototype 2 | 200 | 12.1 | 14.2 | 99.5 |

As it can be concluded from Table 7, the performance for prototype 2 for flow rates between 50-200 L/h is much higher than the performance of prototype 1. It was observed also that the higher the pressure drop the lower is the filtration efficiency. Also, it's worth mentioning here that the selection of the filter media with the appropriate pore size should be coincides well with the size of the intended generated water droplets.

5.2. Calculation of the Steady State Porosity, $\phi_{SS}$

To calculate the porosity, $\phi_{SS}$, at the steady state condition, Eq. (15) from the analytical section was used. The total volume, $V_t$ of the filter media for each prototype design as shown in FIG. 4 is calculated by adding the volume of each filter media. Table 8 shows the thickness and the filtration area for each of the filter media of the two prototypes including the total volume for each prototype.

It should be noticed here that even though the two prototypes have similar thicknesses for the second stage, the total volume for each prototype is different since the two prototypes have distinct filtration areas. The filtration area is one among the important parameters that needs to be accounted for when designing filter element.

In order to implement Eq. (15), and calculate the steady state porosity, $\phi_{SS}$, conservation of mass across the filter media should be used. Table 9 indicates the total amount injected to the filter, the amount drained from the filter, the water injected rate and the total time for each of the five experimental tests.

TABLE 9

Filtration efficiency results and the amount of water that is injected, and drained.

| Test No. | Prototype No. | Flow Rate (L/h) | Total injected Water (L) | Amount of water drained (L) | Water injection rate (L/h) | Test Period (min) | n % Average Filtration Efficiency |
|---|---|---|---|---|---|---|---|
| 1 | Prototype 1 | 50 | 0.02 | 0 | 0.1 | 90 | 17 |
| 2 | Prototype 1 | 90 | 0.18 | 0 | 0.18 | 90 | 0 |
| 3 | Prototype 2 | 50 | 0.15 | 0.05 | 0.1 | 90 | 100 |
| 4 | Prototype 2 | 100 | 0.30 | 0.2 | 0.2 | 90 | 99.8 |
| 5 | Prototype 2 | 200 | 0.62 | 0.54 | 0.4 | 90 | 99.5 |

Using Eq. (15), the calculated filter volumes from Table 8, and the experimental filtration efficiencies from Table 9, the porosity at the steady state conditions can be calculated and it is depicted in Table 10. It should be noted here that the test for each experiment should last for 90 minutes. However, for prototypes 1, the experiment lasted for 32 minutes at 50 L/h, and for 60 minutes at 90 L/h. These tests were stopped due to the clogging of the filter, whereas the tests for prototype 2 lasted for the whole duration of the test and no clogging of the filter was observed.

TABLE 10

Clean and steady state porosity for the $1^{st}$ and the $2^{nd}$ stages of the two simulated filter prototypes.

| | $1^{st}$ stage | $1^{st}$ stage | $2^{nd}$ stage | $2^{nd}$ stage |
|---|---|---|---|---|
| Prototype 1 | Clean Porosity, $\Phi_{11\_j}$ | Steady State Porosity, $\Phi_{11\_SS}$ | Clean Porosity, $\Phi_{12\_j}$ | Steady State Porosity, $\Phi_{12\_SS}$ |
| | 0.9055 | 0.22498 | 0.9055 | 0.9055 |

TABLE 8

Total volume calculations of the two prototypes.

| | Filter media of the first stage | | | | Filter media of the second stage | | | | Total |
|---|---|---|---|---|---|---|---|---|---|
| Prototype No. | Area (m²) | Thickness (m) | Volume (m³) | Volume (L) | Area (m²) | Thickness (m) | Volume (m³) | Volume (L) | Volume (L) |
| Prototype 1 | 0.042 | 0.00066 | 0.00002772 | 0.02772 | 0.011 | 0.00132 | 1.45E-05 | 0.01452 | 0.04224 |
| Prototype 2 | 0.15 | 0.00284 | 0.000426 | 0.426 | 0.071 | 0.0044 | 0.000312 | 0.3124 | 0.7384 |

TABLE 10-continued

Clean and steady state porosity for the 1st and the 2nd stages of the two simulated filter prototypes.

| | 1st stage | 1st stage | 2nd stage | 2nd stage |
|---|---|---|---|---|
| Prototype 2 | Clean Porosity, $\Phi_{21\_i}$ 0.9096 | Steady State Porosity, $\Phi_{21\_SS}$ 0.7742 | Clean Porosity, $\Phi_{22\_i}$ 0.9284 | Steady State Porosity, $\Phi_{22\_SS}$ 0.9284 |

Since most of the separation of the water droplets happens at the first stage, it can be concluded from Table 10 above, that the porosity at steady state of the first stage for prototype 1 reduced 70% from porosity at clean conditions. Whereas, there was no porosity variation between the clean and steady state conditions of the second stages for both prototypes.

5.3. Calculation for the Permeability of the Two Prototypes

The permeability values for the first and the second stages of prototypes 1 & 2 can be calculated using Eq. (16). Table 11 shows the permeability for stages 1 & 2 of the two prototypes.

TABLE 11

Permeability calculation for the 1st and the 2nd stages of the two simulated filter prototypes

| | 1st stage | 2nd stage |
|---|---|---|
| Prototype 1 | Permeability, $K_{11}$, (m$^2$) 1.97E-12 | Permeability, $K_{12}$, (m$^2$) 1.25e-12 |
| Prototype 2 | Permeability, $K_{21}$, (m$^2$) 2.20E-11 | Permeability, $K_{22}$, (m$^2$) 7.71E-12 |

5.4. Computational Fluid Dynamics Versus Experimental Results

Table 12 depicted the pressure drop computed from CFD based on steady state porosity conditions and also shows a comparison of the pressure measured from the experiment and computed from the CFD simulation.

TABLE 12

Experimental and computational pressure drop results of the two prototypes at different flow rates.

| Simulation No. | Prototype No. | Flow Rate (L/h) | Experimental Steady State Pressure drop, (KPa) | CFD results, based on steady state porosity values, Pressure drop, (KPa) |
|---|---|---|---|---|
| 1 | Prototype 1 | 50 | 29.7 | 33.3 |
| 2 | Prototype 1 | 90 | 49.3 | 55.5 |
| 3 | Prototype 2 | 50 | 3.1 | 3.5 |
| 4 | Prototype 2 | 100 | 6.7 | 7.5 |
| 5 | Prototype 2 | 200 | 14.2 | 16.0 |

Table 12 indicates that there is a good correlation for the pressure drop results that is computed from the CFD simulation and measured from the experimental tests. It was estimated that the error measured between the experimental tests and the CFD simulation was in the range of 10-13%. This caused the pressure drop of the filter media to increase even more than the actual pressure.

As will be appreciated by the skilled reader in the context of the present disclosure, each of the examples described herein may be implemented in a variety of different ways. Any feature of any aspects of the disclosure may be combined with any of the other aspects of the disclosure. For example method aspects may be combined with apparatus aspects, and features described with reference to the operation of particular elements of apparatus may be provided in methods which do not use those particular types of apparatus. In addition, each of the features of each of the embodiments is intended to be separable from the features which it is described in combination with, unless it is expressly stated that some other feature is essential to its operation. Each of these separable features may of course be combined with any of the other features of the embodiment in which it is described, or with any of the other features or combination of features of any of the other embodiments described herein. Furthermore, equivalents and modifications not described above may also be employed without departing from the invention.

The characteristic size of a droplet may be defined as an average value (e.g. a mean value) of a probability density function which suitably described a population of the droplets. The probability density function may be, for example, a Gaussian distribution or a Maxwell-Boltzmann distribution.

Certain features of the methods described herein may be implemented in hardware, and one or more functions of the apparatus may be implemented in method steps. It will also be appreciated in the context of the present disclosure that the methods described herein need not be performed in the order in which they are described, nor necessarily in the order in which they are depicted in the drawings. Accordingly, aspects of the disclosure which are described with reference to products or apparatus are also intended to be implemented as methods and vice versa. The methods described herein may be implemented in computer programs, or in hardware or in any combination thereof. Computer programs include software, middleware, firmware, and any combination thereof. Such programs may be provided as signals or network messages and may be recorded on computer readable media such as tangible computer readable media which may store the computer programs in non-transitory form. Hardware includes computers, handheld devices, programmable processors, general purpose processors, application specific integrated circuits (ASICs), field programmable gate arrays (FPGAs), and arrays of logic gates.

Any processors used in the computer system (and any of the activities and apparatus outlined herein) may be implemented with fixed logic such as assemblies of logic gates or programmable logic such as software and/or computer program instructions executed by a processor. The computer system may comprise a central processing unit (CPU) and associated memory, connected to a graphics processing unit (GPU) and its associated memory. Other kinds of programmable logic include programmable processors, programmable digital logic (e.g., a field programmable gate array (FPGA), a tensor processing unit (TPU), an erasable programmable read only memory (EPROM), an electrically erasable programmable read only memory (EEPROM), an application specific integrated circuit (ASIC), or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof. Such data storage media may also provide the data store of the computer system (and any of the apparatus outlined herein).

Other examples and variations of the disclosure will be apparent to the skilled addressee in the context of the present disclosure.

The invention claimed is:

1. A coalescing filter element for separating a multi-phasic fluid comprising droplets of a hydrophilic liquid dispersed in a hydrophobic liquid, the filter element comprising:
a first filter stage for coalescing the droplets from the hydrophobic liquid to provide an intermediate feed, a second filter stage for coalescing the droplets from the intermediate feed, wherein the second filter stage surrounds the first filter stage;
a selectively permeable barrier which permits outflow of the hydrophobic liquid and inhibits outflow of the droplets first phase; and
a gap and a drain both arranged between the second filter stage and the selectively permeable barrier, wherein the gap is in fluid communication with the drain, and the drain is configured to allow outflow of the droplets; and
wherein the first and second filter stages are both selective for coalescing hydrophilic fluids and wherein, the selectively permeable barrier is more permeable to hydrophobic fluids than hydrophilic fluids;
wherein the drain comprises at least one slot in a base of the filter element and wherein the at least one slot is arranged so that the drain cross section is evenly spatially distributed about the second filter stage.

2. The coalescing filter element of claim 1 wherein: the first filter stage is
pleated; the second filter stage is pleated; and a pleat depth of the first filter stage is
greater than a pleat depth of the second filter stage.

3. The coalescing filter element of claim 2 wherein the first filter stage provides a first flow cross section for flow of the feed through the first filter stage, and the second filter stage provides a second flow cross section for flow of the intermediate feed through the second filter stage, wherein the first flow cross section is larger than the second flow cross section.

4. The coalescing filter element of claim 1 wherein the first filter stage is spaced from the second filter stage.

5. The coalescing filter element of claim 1 wherein the drain has a drain cross section in fluid communication with a gap between the second filter stage and the selectively permeable barrier.

6. The coalescing filter element of claim 5 wherein the gap surrounds the second filter stage.

7. A coalescing filter element for separating a multi-phasic fluid comprising a droplets of a hydrophilic liquid dispersed in a hydrophobic liquid, the filter element comprising:
a first filter stage for coalescing the droplets from the hydrophobic liquid to provide an intermediate feed,
a second filter stage for coalescing the droplets from the intermediate feed, wherein the second filter stage surrounds the first filter stage;
a selectively permeable barrier which permits outflow of the hydrophobic liquid and inhibits outflow of the droplets; and
a gap and a drain both arranged between the second filter stage and the selectively permeable barrier, wherein the gap is in fluid communication with the drain, and the drain is configured to allow outflow of the droplets; and
wherein the first and second filter stages are both selective for coalescing hydrophilic fluids and wherein, the selectively permeable barrier is more permeable to hydrophobic fluids than hydrophilic fluids;
wherein the first filter stage is configured for coalescing smaller droplets than the second coalescing filter stage.

8. The coalescing filter element of claim 7 wherein the first filter stage comprises pores having a mean pore size smaller than a mean pore size of pores of the second filter stage.

9. A filtration apparatus comprising:
a filter housing configured to hold a fluid;
a plurality of coalescing filter elements according to claim 1 wherein the coalescing filter elements are disposed within the housing, and each is connected to a separate corresponding one of a plurality of fluid inlet conduits for receiving the multi-phasic fluid, so that the separated second phase flows out of the filter elements and into the filter housing.

10. A method of separating a droplet of a hydrophilic liquid from a multi-phasic fluid the fluid comprising the droplets dispersed in a hydrophobic liquid, the method comprising:
providing a feed of the multiphasic fluid to a first filter stage to partially coalesce the droplets to provide an intermediate feed having droplets of larger size;
providing the intermediate feed to a second filter stage to further coalesce the droplets of larger size and to provide the further coalesced droplets into a gap between the second filter stage and a selectively permeable barrier;
draining the further coalesced first phase from the gap while extracting fluid through the selectively permeable barrier thereby to separate the droplet first phase;
wherein the first and second filter stages are both selective for coalescing hydrophilic fluids and wherein, the selectively permeable barrier is more permeable to hydrophobic fluids than hydrophilic fluids;
wherein the first filter stage is configured for coalescing smaller droplets than the second coalescing filter stage.

11. The method of claim 10 comprising draining the first phase from the gap at a flow rate selected based on the total flow rate of the multi-phasic fluid through the filter and a desired separation efficiency.

12. The method of claim 10 wherein the drain is arranged between the second filter stage and the selectively permeable barrier to allow outflow of the first phase, and the second filter stage surrounds the first filter stage.

13. A computer implemented method of designing a coalescing filter element for
separating components of a fluid feed, the method comprising:
identifying a dynamic viscosity, u, of the fluid feed, and a density, p, of the fluid feed, wherein the fluid feed comprises droplets of a first phase with an initial characteristic droplet size dispersed in the feed, and a second phase;
identifying a target total flow rate of the fluid feed into the filter element, a target outflow rate from an output of the filter element, and a target outflow rate of the first phase from a drain of the filter, the drain having a drain cross section for draining the coalesced first phase from the filter element; and
selecting the drain cross section based on the target outflow rate of the first phase, the density of the fluid, and the dynamic viscosity.

14. The computer implemented method of claim 13 comprising identifying parameters of a selectively permeable barrier for inhibiting re-entrainment of coalesced droplets of the first phase in fluid outflow from the output of the filter element, wherein the drain cross section is further based on the parameters of the selectively permeable barrier.

15. The computer implemented method of claim 14 wherein the drain cross section is further based on a target pressure drop across the selectively permeable barrier.

16. The computer implemented method of claim 14 the filter element comprising:
   two filter stages, arranged in series, for coalescing the droplets of the first phase; and
   a gap disposed between a second one of the two filter stages and the selectively permeable barrier, wherein the drain is provided in a base of the filter element and in the gap.

17. A method comprising:
   using the filter element of claim 1 to separate water from one of diesel and lube oil.

18. A method comprising:
   using the filter element of claim 7 to separate water from one of diesel and lube oil.

* * * * *